United States Patent
Kobayashi

(10) Patent No.: US 7,780,524 B2
(45) Date of Patent: Aug. 24, 2010

(54) MONITORING SYSTEM, GAME MACHINE AND DEVICE MANAGEMENT SYSTEM

(75) Inventor: Hitoshi Kobayashi, Nagoya (JP)

(73) Assignee: Toyomaru Sangyo Kabushiki Kaisha, Nagoya-shi (JP)

( * ) Notice: Subject to any disclaimer, the term of this patent is extended or adjusted under 35 U.S.C. 154(b) by 1225 days.

(21) Appl. No.: 10/515,010

(22) PCT Filed: Aug. 8, 2003

(86) PCT No.: PCT/JP03/10121

§ 371 (c)(1),
(2), (4) Date: Jan. 25, 2005

(87) PCT Pub. No.: WO2004/014504

PCT Pub. Date: Feb. 19, 2004

(65) Prior Publication Data

US 2005/0116049 A1  Jun. 2, 2005

(30) Foreign Application Priority Data

Aug. 9, 2002  (JP) .............................. 2002-232193

(51) Int. Cl.
*A63F 13/00* (2006.01)

(52) U.S. Cl. .............................. 463/29; 463/24; 463/42; 705/29

(58) Field of Classification Search ............... 463/16, 463/20, 24, 29, 40, 42, 43; 705/22, 28, 29
See application file for complete search history.

(56) References Cited

U.S. PATENT DOCUMENTS

| | | |
|---|---|---|
| 4,072,930 A | 2/1978 | Lucero et al. |
| 5,349,345 A | 9/1994 | Vanderschel |
| 5,392,049 A | 2/1995 | Gunnarsson |
| 5,434,755 A | 7/1995 | Corathers et al. |
| 5,434,775 A | 7/1995 | Sims et al. |
| 5,469,727 A | 11/1995 | Spahn et al. |
| 5,629,981 A * | 5/1997 | Nerlikar ..................... 713/168 |

(Continued)

FOREIGN PATENT DOCUMENTS

EP  0 874 335 A1  10/1998

(Continued)

*Primary Examiner*—James S McClellan
(74) *Attorney, Agent, or Firm*—Oliff & Berridge, PLC

(57) ABSTRACT

A board box 80 includes an upper lid portion 80*a* made of transparent resin, and a lower lid portion 80*c* made of transparent resin. A main control board 41 for performing main control to a pachinko game machine 1 is provided on the lower lid portion 80*c*. A thin and rectangular IC tag 86 is provided at the backside of the upper lid portion 80*a*. A coil-shaped antenna 68 for making RF transmission and reception with the IC tag 86 is provided at the lower right end portion of the main control board 41. The distance between the antenna 68 and the IC tag 86 is set to about 3 mm in the state that the upper lid portion 80*a* and the lower lid portion 80*c* are assembled. A R/W unit always polls the IC tag 86 via the antenna 68. If the upper lid portion 80*a* is opened and the distance between the antenna 68 and the IC tag 86 exceeds about 5 mm, the communication becomes unavailable and a fact that the upper lid portion 80*a* has been opened is immediately detected.

6 Claims, 24 Drawing Sheets

U.S. PATENT DOCUMENTS

| | | |
|---|---|---|
| 5,659,291 A | 8/1997 | Kennedy et al. |
| 5,815,557 A | 9/1998 | Larson |
| 6,249,227 B1 | 6/2001 | Brady et al. |
| 6,325,294 B2 * | 12/2001 | Tuttle et al. .................. 235/492 |
| 6,339,385 B1 | 1/2002 | Tuttle |
| 6,353,776 B1 | 3/2002 | Rohrl et al. |
| 6,400,255 B1 | 6/2002 | Ohnishi et al. |
| 6,609,969 B1 | 8/2003 | Luciano et al. |
| 6,681,987 B1 | 1/2004 | Ford |
| 6,718,235 B1 | 4/2004 | Borugian |
| 6,794,988 B1 | 9/2004 | Weiss et al. |
| 7,052,391 B1 * | 5/2006 | Luciano, Jr. ..................... 463/3 |
| 7,112,132 B2 * | 9/2006 | Yamagishi ..................... 463/1 |
| 2002/0055380 A1 * | 5/2002 | Luciano et al. ............... 463/16 |

FOREIGN PATENT DOCUMENTS

| | | |
|---|---|---|
| JP | A-64-56249 | 3/1989 |
| JP | A-9-720 | 1/1997 |
| JP | A 9-34365 | 2/1997 |
| JP | A-10-99512 | 4/1998 |
| JP | A 10-155370 | 6/1998 |
| JP | A-10-169272 | 6/1998 |
| JP | A 10-216324 | 8/1998 |
| JP | A-10-289388 | 10/1998 |
| JP | A 10-328392 | 12/1998 |
| JP | A 2000-149079 | 5/2000 |
| JP | A 2000-288218 | 10/2000 |
| JP | A 2002-175355 | 6/2002 |
| WO | WO 99/05658 | 2/1999 |

* cited by examiner

FIG. 21

DATE:
(hh:mm:ss)

| ID CODE | MACHINE NUMBER | KIND | TIME OF DISAPPEARANCE | TIME OF RECOVERY | TIME PERIOD WHERE IDENTIFICATION HAS BEEN IMPOSSIBLE | TIME AT WHICH ID ERROR HAS OCCURRED |
|---|---|---|---|---|---|---|
| 0583208098 | NO. 0002 | BOARD | 02:38:56 | 03:14:28 | 00:35:32 | |
| 0583208098 | NO. 0002 | BOARD | 03:52:39 | 04:01:00 | 00:08:21 | |
| 0296738591 | NO. 0134 | ATTACKER | 13:58:00 | 14:25:46 | 00:27:46 | |
| 1368207964 | NO. 0063 | BOARD | | | | 01:32:13 |
| ........ | ........ | ........ | ........ | ........ | ........ | ........ |

MONITORING SYSTEM, GAME MACHINE AND DEVICE MANAGEMENT SYSTEM

TECHNICAL FIELD

The present invention relates to a monitoring system for monitoring a state of a device, for example, of a game machine such as a pachinko game machine, a game machine, and a device management system.

BACKGROUND ART

Conventionally, among game machines, pachinko game machines are endlessly subjected to deceit actions in which prize balls are unfairly obtained, and various prevention measures have been taken. Particularly, the control board housing box for housing the control board is provided with various arrangements for preventing unauthorized modifications to a control board which controls the game machine, for example, for preventing replacement to an unauthorized ROM. For example, the control board housing box is provided with a seal. In a pachinko game machine described in Japanese Laid-Open Patent Publication No. 10-216324, the control board hosing box is hard to open because it is provided with a seal screw which rotates only to a tightening direction along which the control board housing box is closed in order to make the main control board untouchable. In a pachinko game machine described in Japanese Laid-Open Patent Publication No. 9-34365, opening and closing operations to the housing box are detected using a movable contact point, and the detection signal from the movable contact point is stored and is annunciated by a light emitting diode. In a game device described in Japanese Laid-Open Patent Publication No. 2000-288218, an IC tag is attached onto the surface of the control board housing box. In response to a request for transmission from an ID read unit, the IC tag is allowed to transmit identification information stored therein to the ID read unit. It is determined by confirming the identification information whether or not the control board housing box, involving the control board, has been entirely replaced unfairly.

However, in the arrangement using the seal, if the control board housing box is opened and a ROM is replaced with an unauthorized one, and then a sophisticated imitation seal is attached, it is hard to determine whether or not the control board housing box has been opened and then closed. In the arrangement using a seal screw, there are some cases where the seal screw is forcibly turned to its opening direction by means of a special tool to open the control board housing box and a ROM is replaced with an unauthorized one. Further, in the arrangement in which the opening and closing operations to the control board housing box are detected using the movable contact point, since the control board housing box is usually made of a transparent resin, the presence of the movable contact point for use in detecting the opening and closing operations to the housing box can be visually seen. Therefore, there are some cases where a piano wire or the like is inserted through the clearance of the board housing box so as to prevent the movable contact point from moving. In this case, there arises a problem that the opening and closing operations to the control board housing box cannot be detected. Further, these above-described prior arts have a problem that whether or not the control board housing box has been opened and closed can be determined only when the control box is visually checked. In many cases, deceit actions are made at night and it is cumbersome to inspect and check each of several hundreds of game machines in an amusement center every morning. In the arrangement in which the unauthorized replacement of the control board housing box is monitored by identifying the IC tag, since the ID read unit is placed outside of the control board housing box, it is possible to open the control board hosing box without changing the relative position between the IC tag and the ID read unit so as to replace the ROM on the housed control board with an unauthorized one. Eventually, this arrangement is not sufficient to detect deceit actions at an early stage.

DISCLOSURE OF THE INVENTION

The present invention has been made to solve the above-described problems, and an objective thereof is to provide a monitoring system, a game machine, and a device management system for monitoring the states of the device such as opening and closing operations to the control board housing box in real time.

A monitoring system of a first invention of the present application comprises an IC tag, and an IC tag monitoring device that makes communication with the IC tag, wherein said IC tag stores identification data that is used for distinguishing the IC tag from other IC tags, and said IC tag monitoring device includes a transmission circuit that transmits a calling wave for calling said IC tag, a reception circuit that receives a reflected wave returned from said IC tag, an antenna that is connected to said transmission circuit and said reception circuit, and determination means for determining that an abnormality has occurred if said reception circuit does not receive the reflected wave within a specified period of time since said transmission circuit transmits the calling wave and the communication becomes unavailable, or if said identification data contained in said reflected wave differs from registered data that is registered beforehand.

In thus-structured monitoring system, a transmission circuit which is provided to the IC tag monitoring device transmits a calling wave to the IC tag containing an IC chip via the antenna, so as to call the IC tag. Then, the IC tag returns a reflected wave containing identification data such as an ID code which the IC tag stores. The reception circuit which is provided to the IC tag monitoring device receives the reflected wave via the antenna. Then, the determination means determines that an abnormality has occurred if the reception circuit does not receive the reflected wave within a specified period of time since the transmission circuit transmits the calling wave and the communication becomes unavailable, or if the identification data contained in the reflected wave differs from registered data that is registered beforehand.

The IC tag is also referred to as a radio frequency-identification (RFID). The IC chip contained in the IC tag is the same type as of a non-contact type IC card, and provides communication in non-contact communication. In addition to the ID code specific to the IC tag, an ID of the provided device (manufacturer's ID), a management code of an amusement center (hall ID), and the like can be additionally stored in the memory area within the IC chip as identification data. These IDs are respectively structured by unique information (i.e. information that can be uniquely identified) of about 64 bits. When these IDs are formed into double or triple structure, it becomes very difficult to copy and unfairly utilize these IDs. Since the reflected wave which is transmitted in response to the calling wave contains such identification data, its modification or so-called "disguise" is difficult as compared with light, electricity, and the like. Therefore, if the IC tag is normally located at a position where a communication from the antenna is available, and then, for example, the member to which the IC tag is fixedly attached is moved out of the communication available range, the reflected wave cannot be received and communication becomes unavailable. When the member returns to the position with in the communication available range from the communication unavailable state again, the reception of the reflected wave is enabled again. With this arrangement, changes in the device that the member has been opened, moved, and the like can be detected without relying on visual observation. If the communication unavailability and the return of communication are stored and are left in the history, it is possible to distinguish a normal state from an abnormal state, and the monitoring can be made effectively.

Further, the monitoring system of the present invention may be structured in such a manner that the reception circuit cannot receive said reflected wave if a distance between the IC tag and said antenna changes to a value exceeding a specified threshold value. In thus-structured monitoring system, if the IC tag is apart from the antenna beyond a specified distance, the reception circuit cannot receive the reflected wave and the communication becomes unavailable. Therefore, if the IC tag is provided to a member which is opened and closed, and then if the member is opened and the IC tag is apart from the antenna beyond a specified distance, the communication becomes unavailable. Therefore, the fact that the member has been opened can be detected.

Further, in the monitoring system of the present invention, the IC tag monitoring device may include storage means for storing a result of determination made by said determination means, or for storing monitoring history data containing at least one of the time of disappearance that is the point of time at which the communication available state in which said reception circuit can receive said reflected wave has changed into the communication unavailable state in which said reception circuit cannot receive said reflected wave, or the time of recovery that is the point of time at which the communication unavailable state has changed into said communication available state, and the time of ID abnormality that is the point of time at which identification data different from the registered data that has been registered beforehand has received.

In thus-structured monitoring system, the storage means stores the result of determination or the monitoring history data. The monitoring history data contains either one of the time at which the reception circuit has run into a state that it cannot receive the reflected wave (time of disappearance), the time at which the reception circuit has recovered into a state that it can receive the reflected wave again (time of recovery), and the time at which identification data different from the registered data which is registered beforehand has been received due to an unauthorized replacement of the IC tag and the like (time of ID abnormality). Therefore, the monitoring history of the IC tag can be referred later. In addition, since the accurate time at which a deceit action has made can be known, if a surveillance camera is provided to an amusement center and the like which includes a device provided with the monitoring system, a person who has made the deceit action can be specified by checking the images left in the surveillance camera.

Further, in the monitoring system of the present invention, the storage means may not store said determination result and said monitoring history data when the result of the determination made by said determination means is normal continuously from the previous time, and when the result of the determination made by said determination means is abnormal continuously from the previous time.

In thus-structured monitoring system, the determination result and the monitoring history data are not stored when the result of the determination made by said determination means is normal or abnormal continuously from the previous time. Therefore, if there is no change in the state, the result of determination and monitoring history data are not stored regardless whether or not the state is normal or abnormal, but are stored only when there is a change in the state. With this arrangement, the storage capacity can be saved.

Further, in the monitoring system of the present invention, the transmission circuit may transmit the calling wave to said IC tag, and transmit the calling wave to said IC tag again immediately after said determination means has made determination and said storage means has made storage.

In thus-structured monitoring system, a calling wave is transmitted to the IC tag. If no reflected wave is received after waiting for a specified period of time, it is determined that the communication becomes unavailable and an abnormality has occurred, and the result of determination and the monitoring history data are stored if necessary. Immediately after that, a calling wave is transmitted to the IC tag again. If the reflected wave is received, it is checked whether or not the identification data contained in the reflected wave is true. If not true, it is determined that an abnormality has occurred. Then, the result of determination and the monitoring history data are stored if necessary as is the case where the communication is unavailable. Immediately after that, a calling wave is transmitted to the IC tag again. If the identification data contained in the reflected wave is true, it is determined the state is normal. Then, the result of determination and the monitoring history data are stored if necessary. Immediately after that, the IC tag is called again. By use of this method, the IC tag is always called to monitor the state of the device. In this way, an abnormality can be found in real time and can be outputted to the outside, or its history can be left.

Further, in the monitoring system of the present invention, the IC tag monitoring device may further comprise output means for outputting stored details that said storage means has stored to the outside. In thus-structured monitoring system, the stored result of determination and the monitoring history data are outputted to the outside. Therefore, if it is determined that an abnormality has occurred, it is possible to alert a staff to the abnormality by light, sound, and like.

Further, in the monitoring system of the present invention, the IC tag monitoring device may include output means for outputting to the outside a result of determination made by said determination means, or monitoring history data containing at least one of the time of disappearance that is the point of time at which the communication available state in which said reception circuit can receive said reflected wave has changed into the communication unavailable state in which said reception circuit cannot receive said reflected wave, or the time of recovery that is the point of time at which the communication unavailable state has changed into said communication available state, or the time of ID abnormality that is the point of time at which identification data different from the registered data that has been registered beforehand has received.

In thus-structured monitoring system, the output means outputs the result of determination or the monitoring history data to the outside. The monitoring history data contains either one of the time at which the reception circuit has run into a state that it cannot receive the reflected wave (time of disappearance), the time at which the reception circuit has recovered into a state that it can receive the reflected wave again (time of recovery), and the time at which identification data different from the registered data which is registered beforehand has been received due to an unauthorized replacement of the IC tag and the like (time of ID abnormality). The outputted result of determination and monitoring history data are used for making an annunciation at the external device, or are stored in the external device so that the monitoring history of the IC tag can be referred later. In addition, since the accurate time at which a deceit action has made can be known, if a surveillance camera is provided to an amusement center and the like which includes a device provided with the monitoring system, and a person who has made the deceit action can be specified by checking the images left in the surveillance camera.

Further, in the monitoring system of the present invention, the output means may not output said determination result and said monitoring history data when the result of the determination made by said determination means is normal continuously from the previous time, and when the result of the determination made by said determination means is abnormal continuously from the previous time.

In thus-structured monitoring system, the determination result and the monitoring history data are not outputted to the outside when the result of the determination made by said determination means is normal or abnormal continuously from the previous time. Therefore, if there is no change in the state, the result of determination and monitoring history data are not outputted to the outside regardless whether or not the state is normal or abnormal, but are outputted to the outside only when there is a change in the state. With this arrangement, the outputted result can be efficiently utilized.

Further, in the monitoring system of the present invention, the transmission circuit may transmit the calling wave to said IC tag, and may transmit the calling wave to said IC tag again immediately after said determination means has made determination and said output means has made output.

In thus-structured monitoring system, a calling wave is transmitted to the IC tag. If no reflected wave is received after waiting for a specified period of time, it is determined that the communication becomes unavailable and an abnormality has occurred, and the result of determination and the monitoring history data are outputted to the outside if necessary. Immediately after that, a calling wave is transmitted to the IC tag again. If the reflected wave is received, it is checked whether or not the identification data contained in the reflected wave is true. If not true, it is determined that an abnormality has occurred. Then, the result of determination and the monitoring history data are outputted to the outside if necessary as is the case where the communication is unavailable. Immediately after that, a calling wave is transmitted to the IC tag again. If the identification data contained in the reflected wave is true, it is determined the state is normal. Then, the result of determination and the monitoring history data are outputted to the outside if necessary. Immediately after that, the IC tag is called again. By use of this method, the IC tag is always called to monitor the state of the device. In this way, an abnormality can be found in real time and can be outputted to the outside, or its history can be left.

Next, the game machine of a second invention of the present application comprises a monitoring system of the first invention. Thus structured game machine can achieve a function and effect of the first invention.

Further, the game machine of the present invention may comprises an encapsulating member that encapsulates a board including a control element that controls the game machine thereon, and includes a main body member and a covering member detachable from the main body member, wherein one of said IC tag and said antenna may be provided to said main body member and the other is provided to said covering member, and both of said IC tag and said antenna may be encapsulated in said encapsulating member in the state that said main body member and said covering member are assembled.

In thus-structured game machine, the IC tag and the antenna are provided on the main body member and the covering member respectively. The IC tag and the antenna are encapsulated in the encapsulating member when the main body member and the covering member are assembled. With this arrangement, if the covering member is opened, the relative position between the IC tag and the antenna changes and the communication between them becomes unavailable. By outputting this information to the outside or storing it to keep its history, a deceit opening action aiming at the replacement of the board and the like can be detected. If the game machine is structured so as to alert immediately, such a structure serves to find deceit actions at an early stage.

Further, the game machine of the present invention may further comprise a movable member that operates when specified conditions are established, wherein either one of said IC tag and said antenna may be provided to said movable member, and in its vicinity where communication is available, the other may be provided.

In thus-structured game machine, either one of the IC tag and the antenna is provided to the game member including the movable member which operates when the specified conditions have been established in a scoring port, a startup port, and the like, and in its vicinity where communication is available, the other is provided. Therefore, if the movable member operates, the reflected wave cannot be received. In comparison between the state that the reflected wave cannot be received and whether or not the specified conditions have been established, it is possible to detect whether the operation is a normal operation or a deceit action. In order that the specified conditions are established, a lottery should be made when a game medium goes into any scoring hole or gate, and the result of the lottery should fall to a predetermined scoring value, and the like.

Next, a device management system of a third invention of the present application is a device management system in which a device that includes the monitoring system provided with the output means of the first invention is connected with a management machine that manages the device via a network, wherein said management machine may comprise monitoring history data reception means for receiving said result of determination that is outputted from said output means or for receiving said monitoring history data.

In thus-structured device management system, the monitoring history data reception means of the management machine receives the result of determination and monitoring history data which are outputted from the output means of the IC tag monitoring device. Therefore, the monitoring history data of the respective devices can be recognized at the management machine, and necessary measures can be taken at an early stage.

Further, in the device management system of the present invention, the management machine may further comprise monitoring history data storage means for storing said result of determination that said monitoring history data reception means has received or said monitoring history data.

In thus-structured device management system, the monitoring history data storage means of the management machine stores the received monitoring history data. Therefore, all of the monitoring history data of the respective devices are stored at the management machine side, so that flexible measurement can be taken such as, for example, clearing the details of storage in the IC monitoring device or comparing monitoring histories of plural devices with each other, and the like.

Further, in the device management system of the present invention, the management machine may further comprise monitoring history data output means for outputting said result of determination that said monitoring history data reception means has received or said monitoring history data.

In thus-structured device management system, the monitoring history data output means of the management machine outputs the received monitoring history data. Therefore, measurement to deceit actions and the like can be efficiently taken by displaying all of the monitoring histories of plural devices at a single location or annunciating the deceit actions using an alarm lamp, sounds, and the like.

BRIEF DESCRIPTION OF THE DRAWINGS

FIG. 21 is a schematic diagram of a history data base.

BEST MODE FOR CARRYING OUT THE INVENTION

Hereinafter, an embodiment of the present invention will be described in the following order with reference to the drawings.

Figure 1:
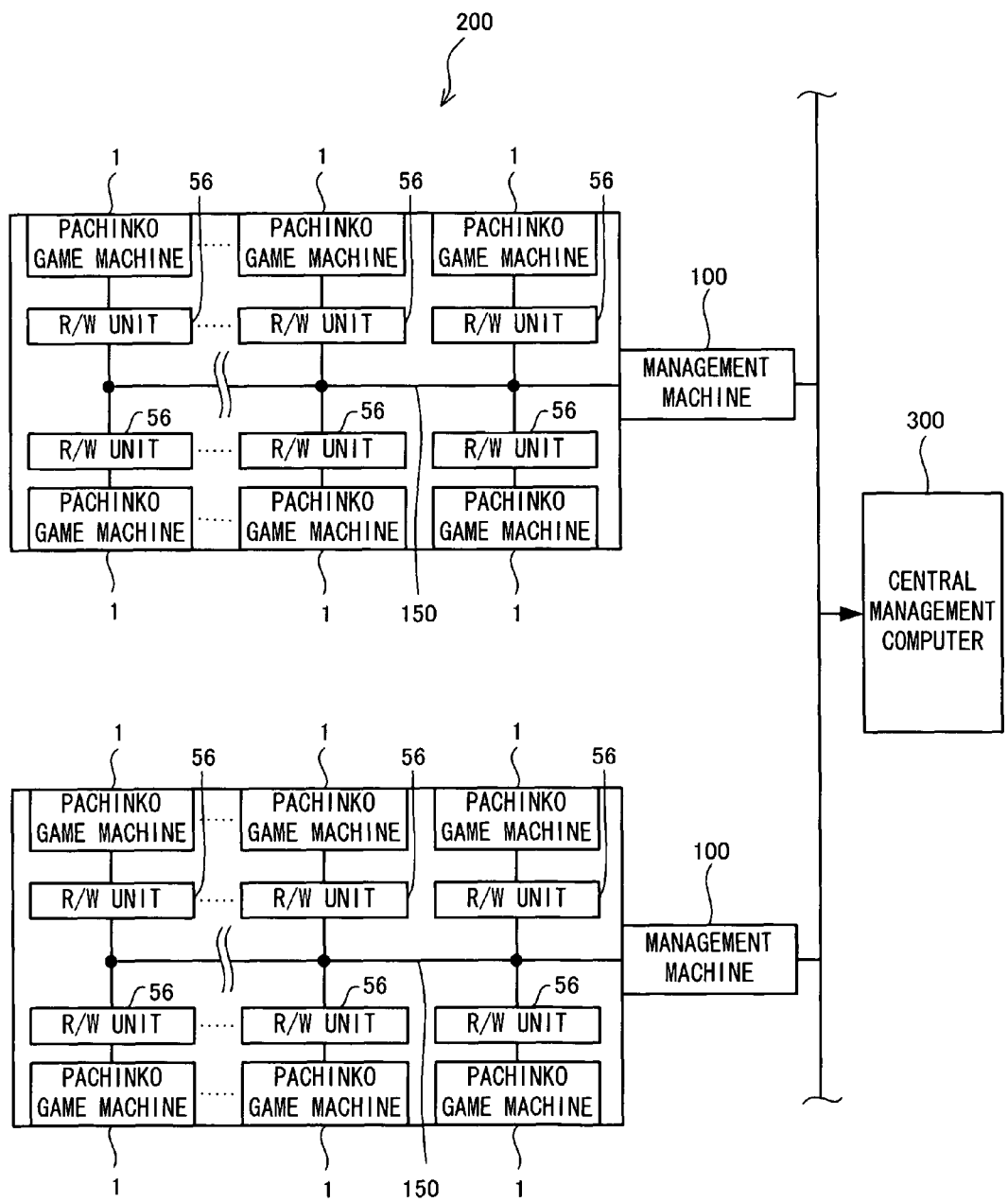
FIG. 1 is a system structural diagram of a management system 200.

1. Brief description of the system structure
2. Description of the structure of the device
3. Description of the structure of the inventive elements
4. Description of the structure of the hardware inside the device
5. Description of the structure of the inventive hardware elements
6. Description of the operations of the inventive elements
7. Description of the exemplified modifications
8. Effects of the embodiment 1. Brief Description of the System Structure FIG. 1 is a structural diagram of a management system 200 obtained by applying the present invention to a management system of game machines in an amusement center. In the management system 200, game machine placement islands, each including a plurality of pachinko game machines 1 in the amusement center arranged in two lines back to back with each other, are respectively provided with a management machine 100, and the pachinko game machines (game machines) 1 placed in the game machine placement island are connected to the management machine 100 via a reader/writer unit (hereinafter, referred to as a "R/W" unit) 56. The pachinko game machine 1 is provided with a board box 80 located at a backside thereof in which a main control board 41 for controlling the game machine is contained (see FIG. 4). IC tags are storing ID codes (identification data) respectively provided at opening and closing doors of the board box 80 and a big scoring hole 16 (see FIG. 2). A calling wave is transmitted to the IC tags and the reflected waves therefrom are received, and the ID codes contained in the reflected waves are read so as to detect that the member provided with the IC tag has been opened. The detected result is transmitted to the management machine 100 for allowing the management machine 100 to make an annunciation, so that any proper action can be taken within the amusement center. In the management system 200, each of the R/W units 56 is connected with the management machine 100 via a communication cable 150 such as a LAN cable. Each of the pachinko game machines 1 includes an independent R/W unit 56 (IC tag monitoring device) for calling IC tags and reading identification data therefrom. The management machine 100 is further connected to a central management computer 300 which further manages the overall amusement center. The central management computer 300 entirely manages each of the management devices 100.

2. Description of the Structure of the Device

Figure 2:
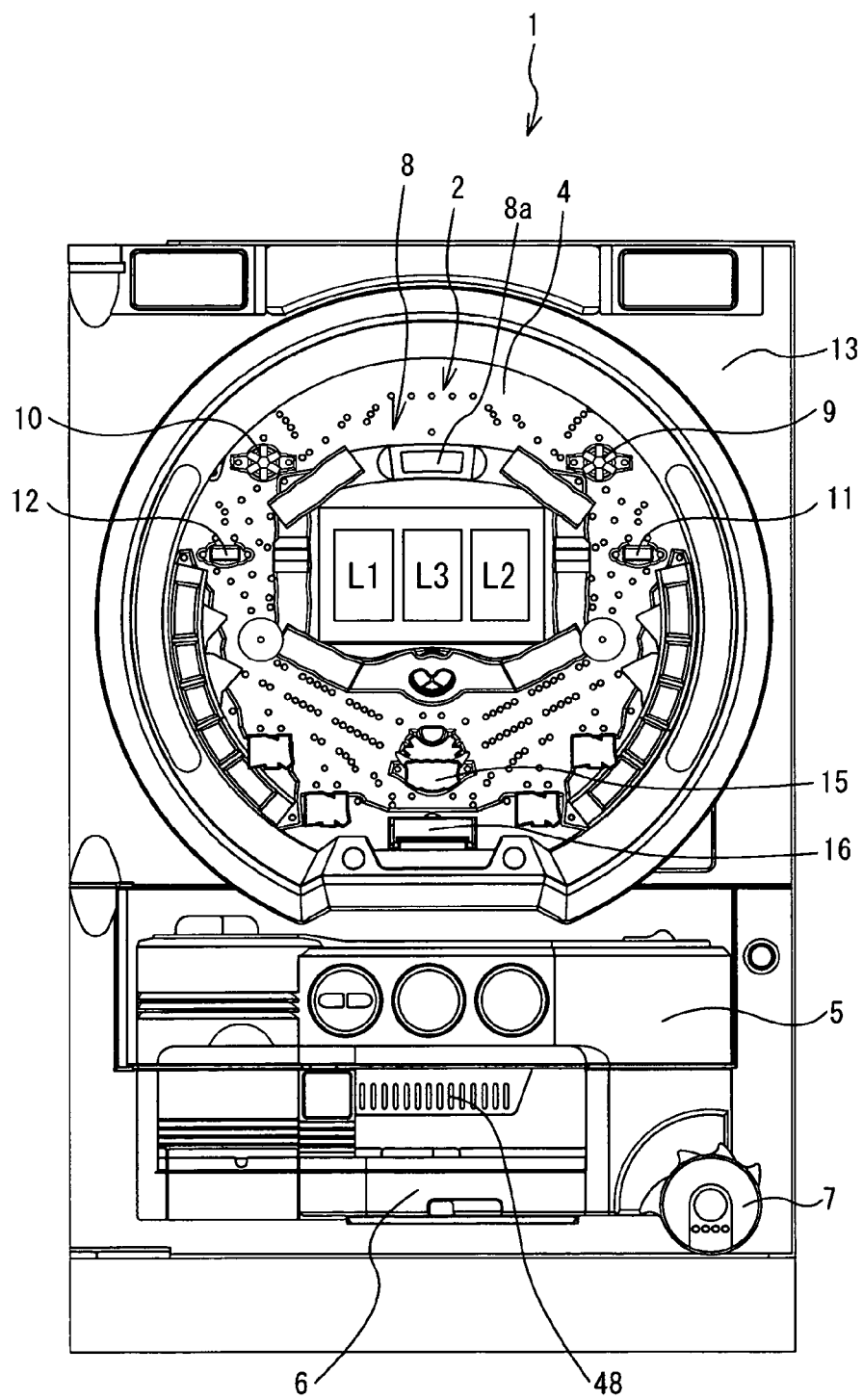
FIG. 2 is a front view of a pachinko game machine 1.
Figure 3:
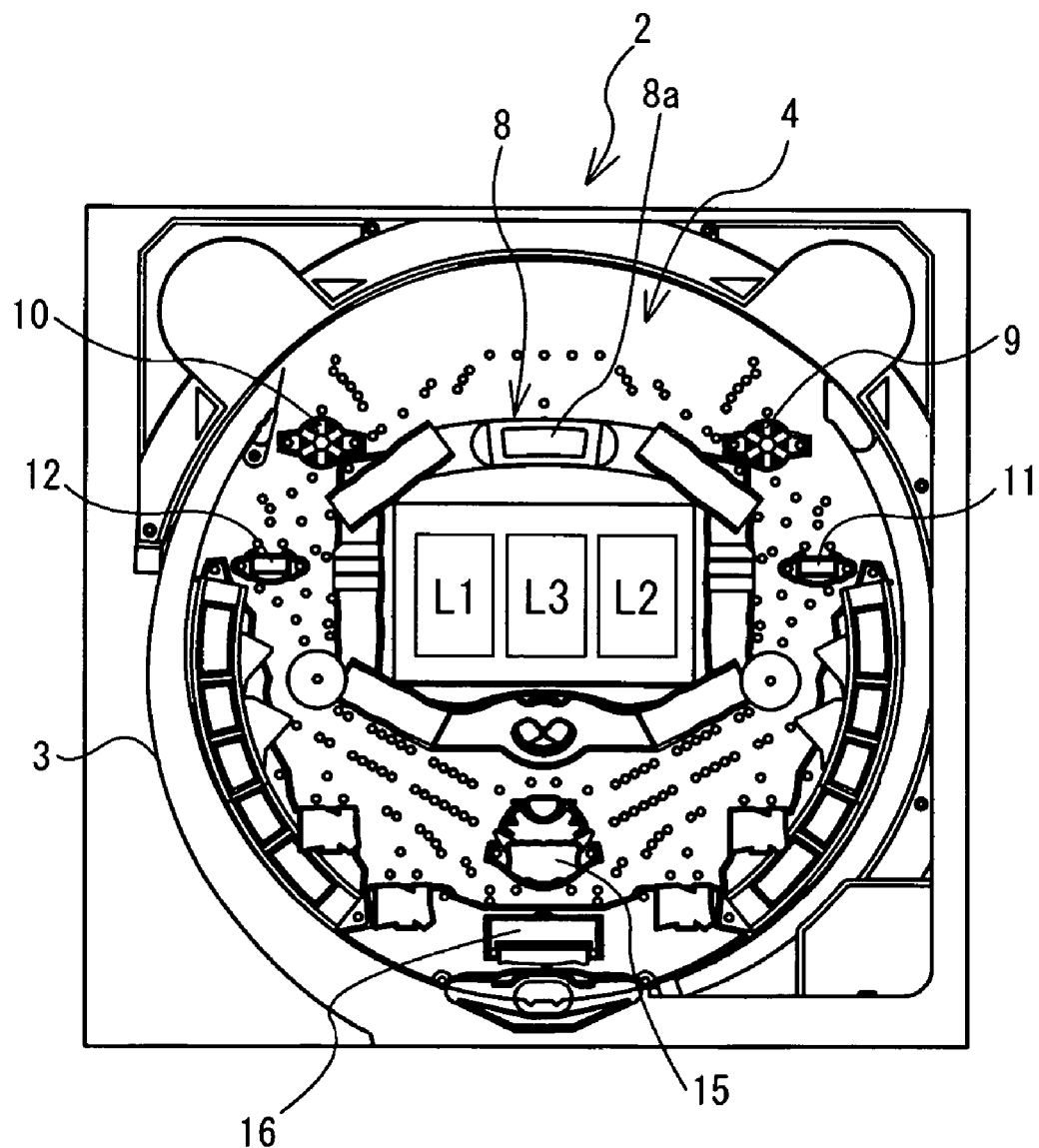
FIG. 3 is a front view of a game board 2 of the pachinko game machine 1.

FIG. 2 is a front view of the pachinko game machine 1, and FIG. 3 is a front view of a game board 2 of the pachinko game machine 1. As shown in FIGS. 2 and 3, the substantially square-shaped game board 2 is provided at an upper half of front side of the pachinko game machine 1. The game board 2 has a substantially round-shaped game area 4 surrounded by a guide rail 3. The game board 2 is covered with a transparent glass board for protecting the game area 4 and allowing a game player to see the game board 2. The glass board is supported by a glass frame 13. At a lower portion of the game board 2 of the pachinko game machine 1, an upper tray 5 is provided for supplying game balls to an unillustrated launching machine and receiving prize balls. Immediately below the upper tray 5, a lower tray 6 is provided for receiving prize balls. A launching handle 7 is provided at a right side of the lower tray 6, and a speaker 48 is provided between the upper tray 5 and the lower tray 6.

At a substantially center portion in the game area 4, a special design display device 8 having a liquid crystal display screen is provided. The special design display device 8 includes a first design stop portion L1, a second design stop portion L2, a third design stop portion L3, and an ordinary design display portion 8a. The ordinary design display portion 8a can display a number in single figure, a single alphabet, a symbol or a mark. An illuminated windmill 9 is provided with above right of the special design display device 8. An illuminated windmill 10 is provided above left of the special design display device 8. Further, at the right of the special design display device 8, an ordinary design startup gate 11 is provided, and an ordinary design startup gate 12 is provided at the left of the special design display device 8. In addition, a special design startup device 15 is provided below the special design display device 8, and the big scoring hole 16 is provided below the special design startup device 15. The game board 2 also includes, on top of the above, various illumination lamps, windmills, a large number of obstruction pegs, and the like.

Figure 4:
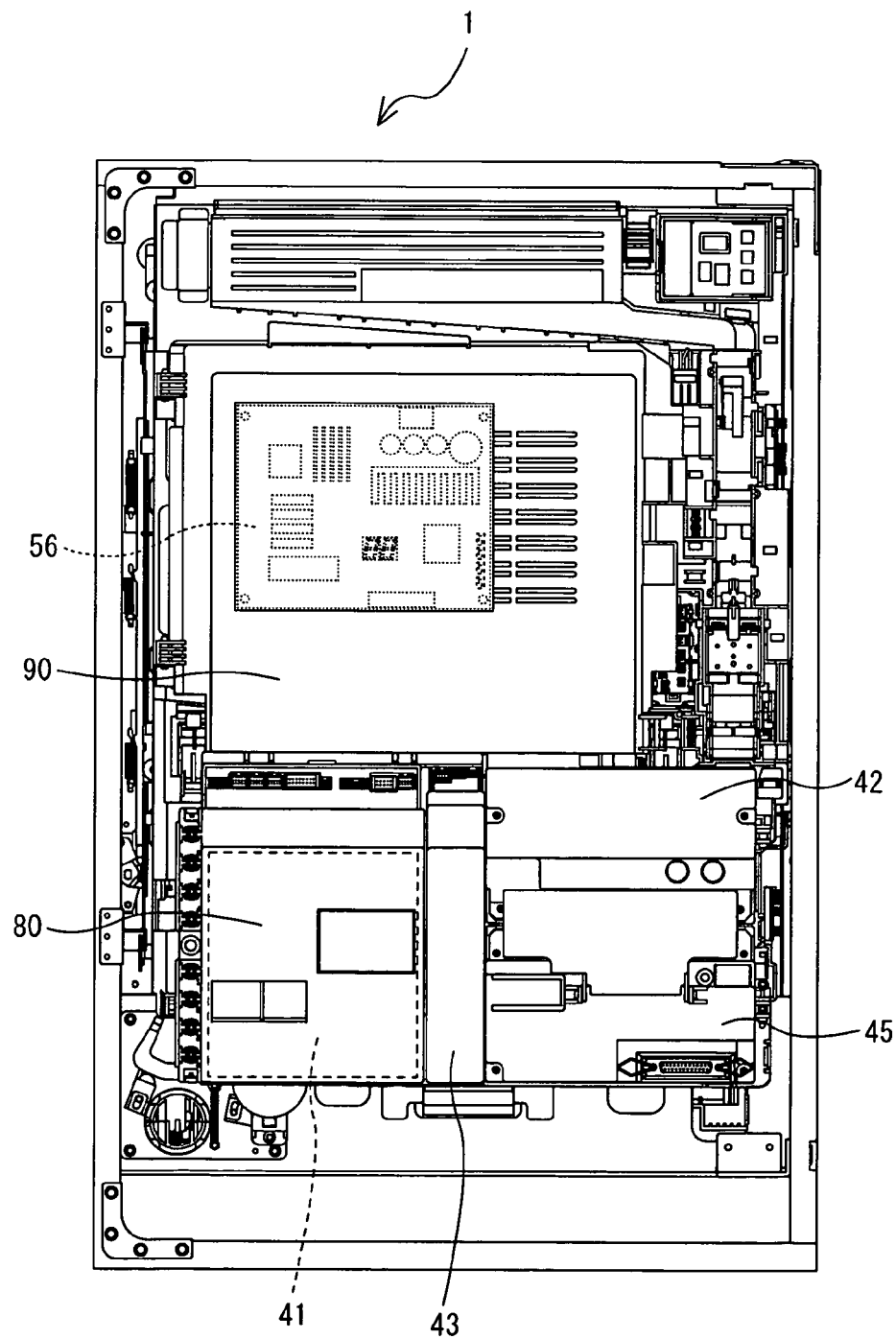
FIG. 4 is a backside view of the pachinko game machine 1.

Next, a structure of the backside of the pachinko game machine 1 will be described with reference to FIG. 4. FIG. 4 is a backside view of the pachinko game machine 1. As shown in FIG. 4, the board box 80 in which the main control board 41 for performing main control to the pachinko game machine 1 is contained is provided at the lower left side on the backside of the pachinko game machine 1. A sound board 43 is located next to the right side of the board box 80, and an electric power board 42 is located next to the upper right side of the sound board 43, and an ejection control board 45 is located below the electric power board 42. The sound board 43, the electric power board 42, and the ejection control board 45 are respectively contained in a transparent resin box. Further, a center covering 90 is located above the board box 80 for protecting the backside of the game board and covering various wirings. The R/W unit 56 for calling an IC tag and reading the ID code therefrom is provided at the outside of the center covering 90.

3. Description of the Structure of the Inventive Elements

Figure 5:
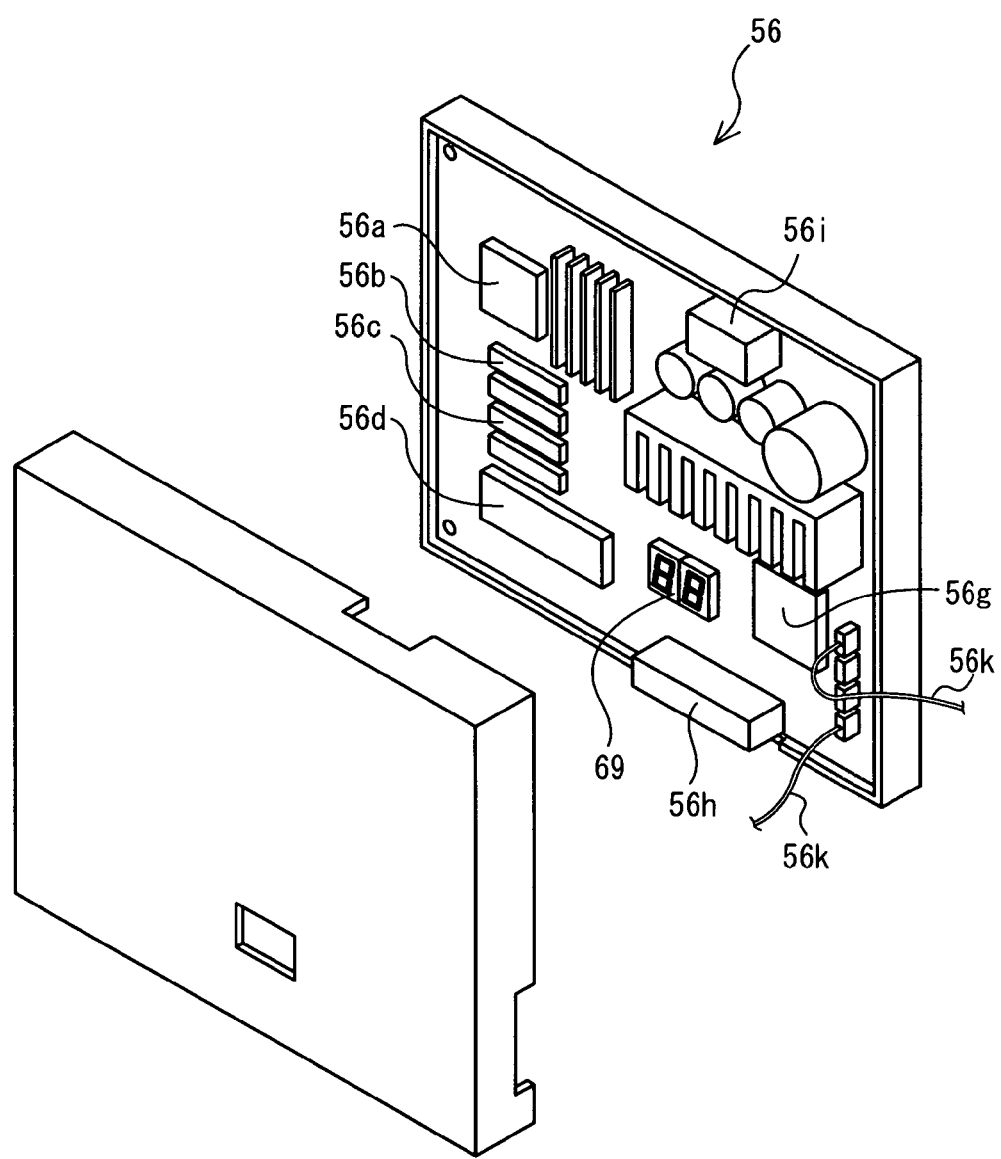
FIG. 5 is an exploded perspective view of an R/W unit 56.

Next, the R/W (reader/writer) unit 56, used as an IC tag monitoring device, will be described with reference to FIG. 5. FIG. 5 is an exploded perspective view of the R/W unit 56. As shown in FIG. 5, the R/W unit 56 is attached to the outside of the center covering 90 above the board box 80 (see FIG. 4). The R/W unit 56 is structured as a unit independent from the pachinko game machine 1 and supplied with an electric power from the game machine placement island. As shown in FIG. 5, the R/W unit 56 includes a CPU 56a, RAM 56b, ROM 56c, EEPROM 56d, RF circuit 56g, LAN card 56h, and input port 56i. The R/W unit 56 is connected with antennas 68 and 168 (described later) from the RF circuit 56g, used as transmitting circuit and receiving circuit, through a coaxial cable 56k, and is connected with the management machine 100 from the LAN card 56h through the LAN cable. Further, the R/W unit 56 receives a signal from the main control board 41 of the pachinko game machine 1 via the input port 56i. The R/W unit 56 performs wireless communication with IC tags 86 and/or 186 via the antennas 68 and 168 respectively. The R/W unit 56 also includes a seven-segmented display unit 69 which lights up when any abnormality occurs in the communication with the IC tag 86 or 186. When the IC tags come into a state that they cannot be identified or an error occurs in their IDs and an abnormality in opening and closing operations is detected at the location where the pachinko game machine 1 is placed, the seven-segmented display unit 69 specifies the location where the abnormality has occurred (for example, by means of a mark such as A or B) and displays an accumulated total number of times that the abnormalities (opening and closing operations) have occurred.

Figure 6:
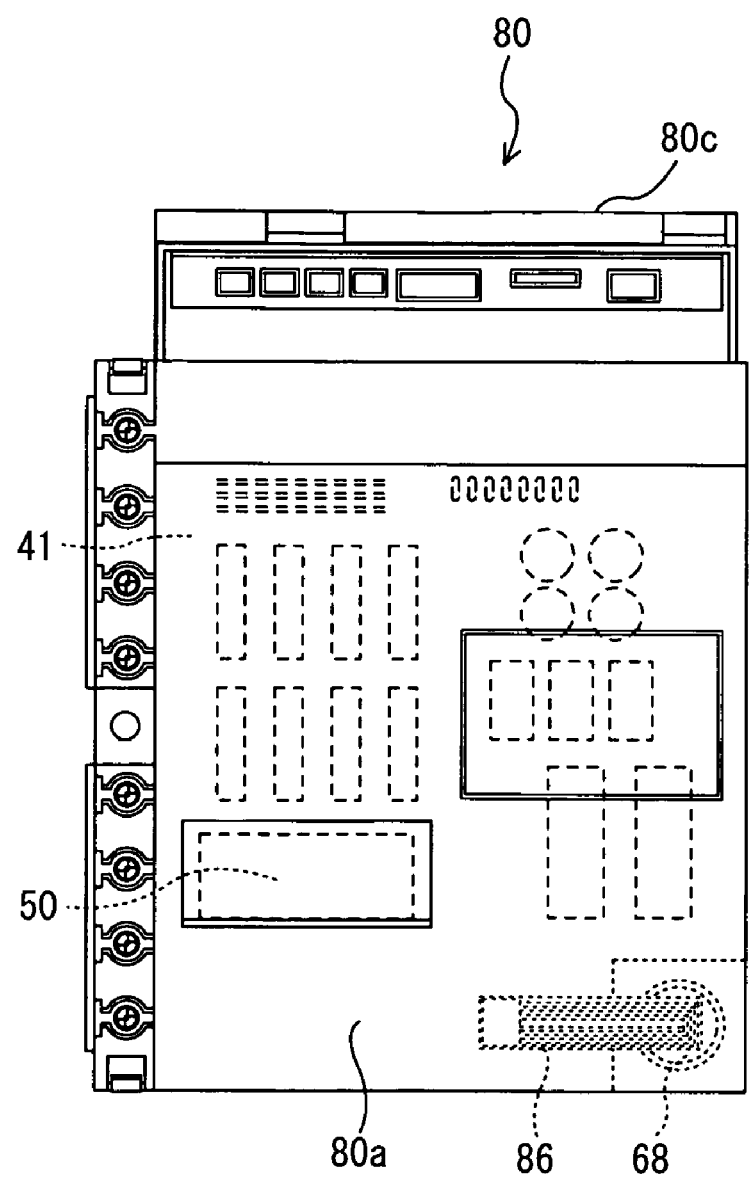
FIG. 6 is a plan view of a board box 80.
Figure 7:
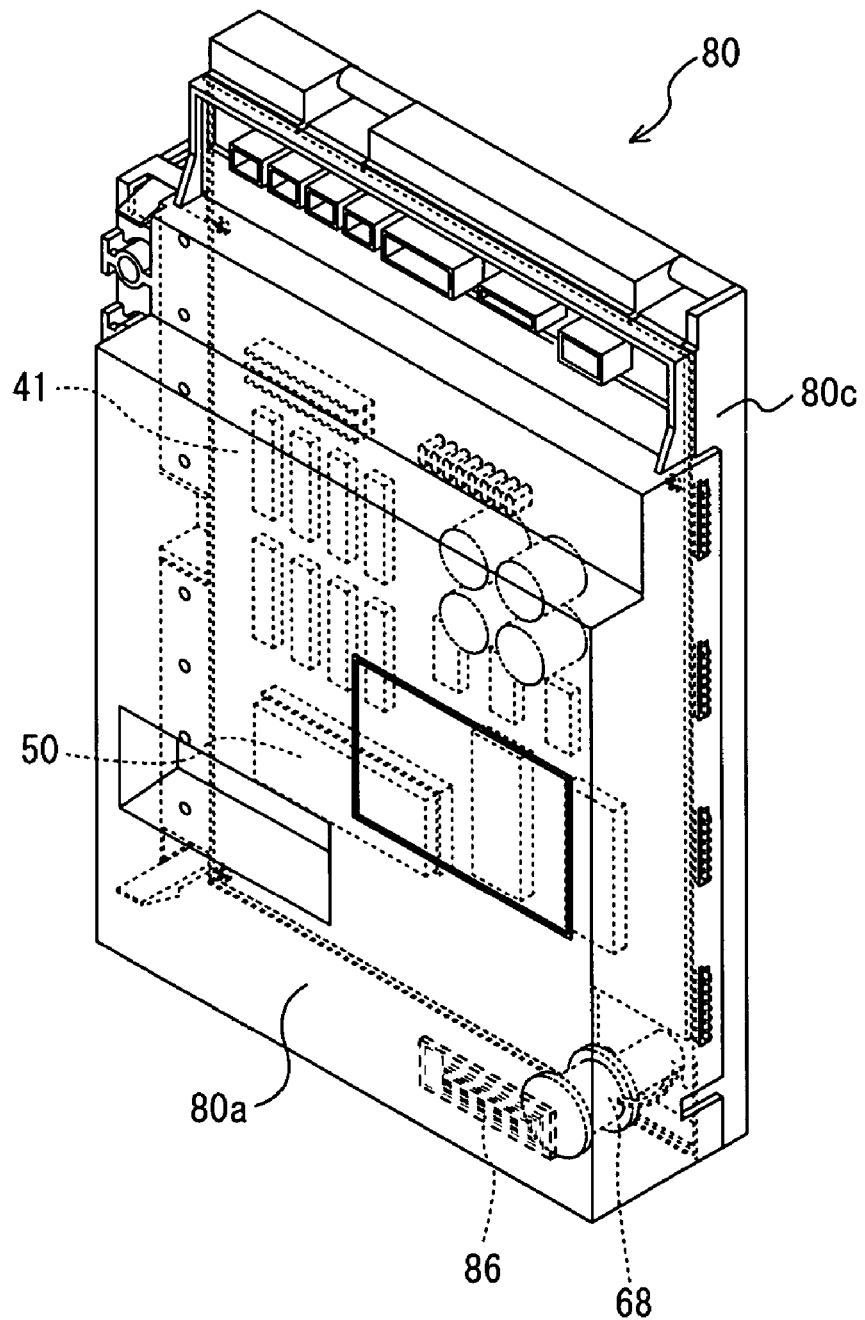
FIG. 7 is a perspective view of the board box 80.

Next, a structure of the board box 80 will be described with reference to FIGS. 6 to 9. FIG. 6 is a plan view of the board box 80; FIG. 7 is a perspective view of the board box 80; and FIGS. 8 and 9 are exploded perspective views of the board box 80.

Figure 8:
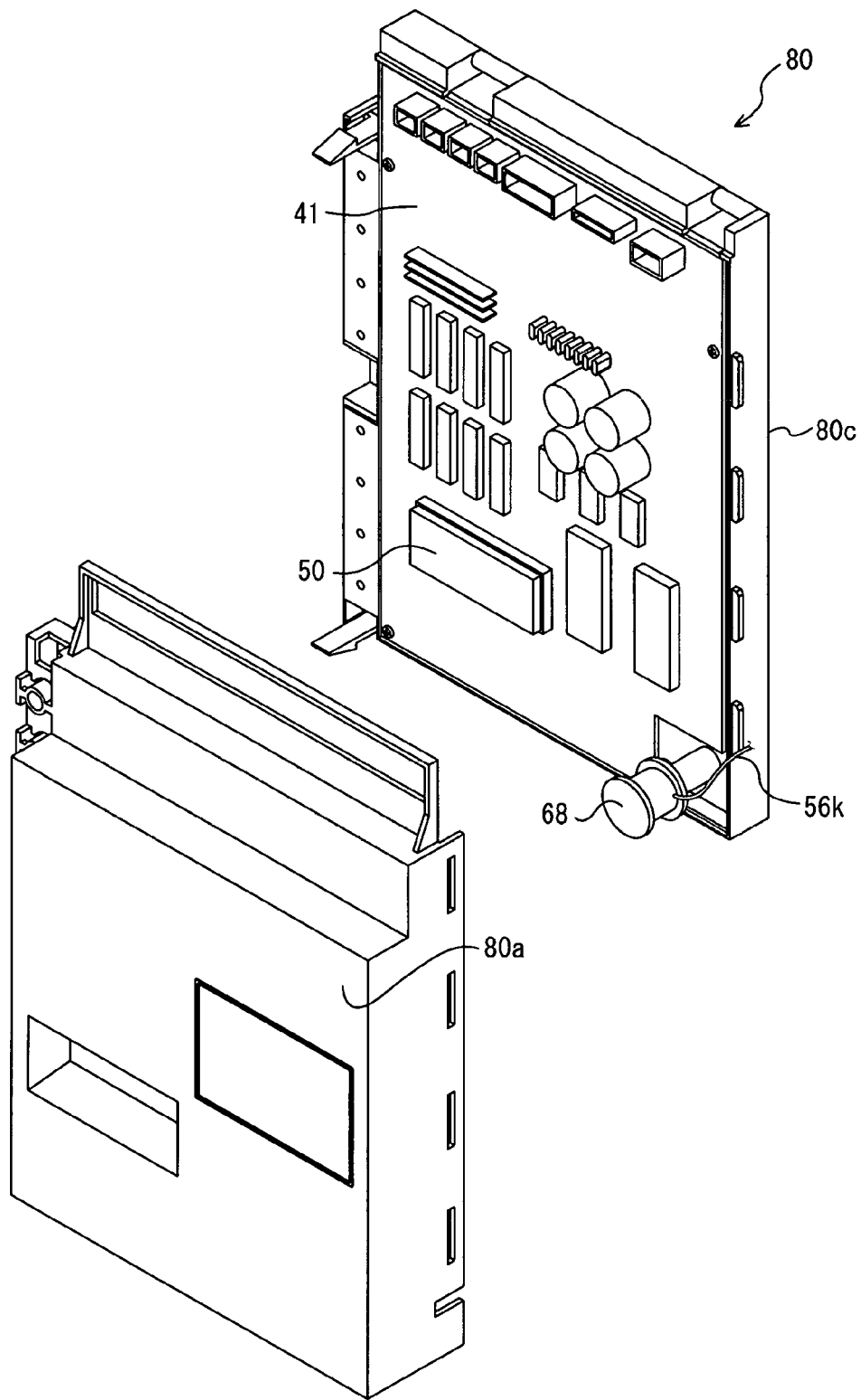
FIG. 8 is an exploded perspective view of the board box 80.
Figure 9:
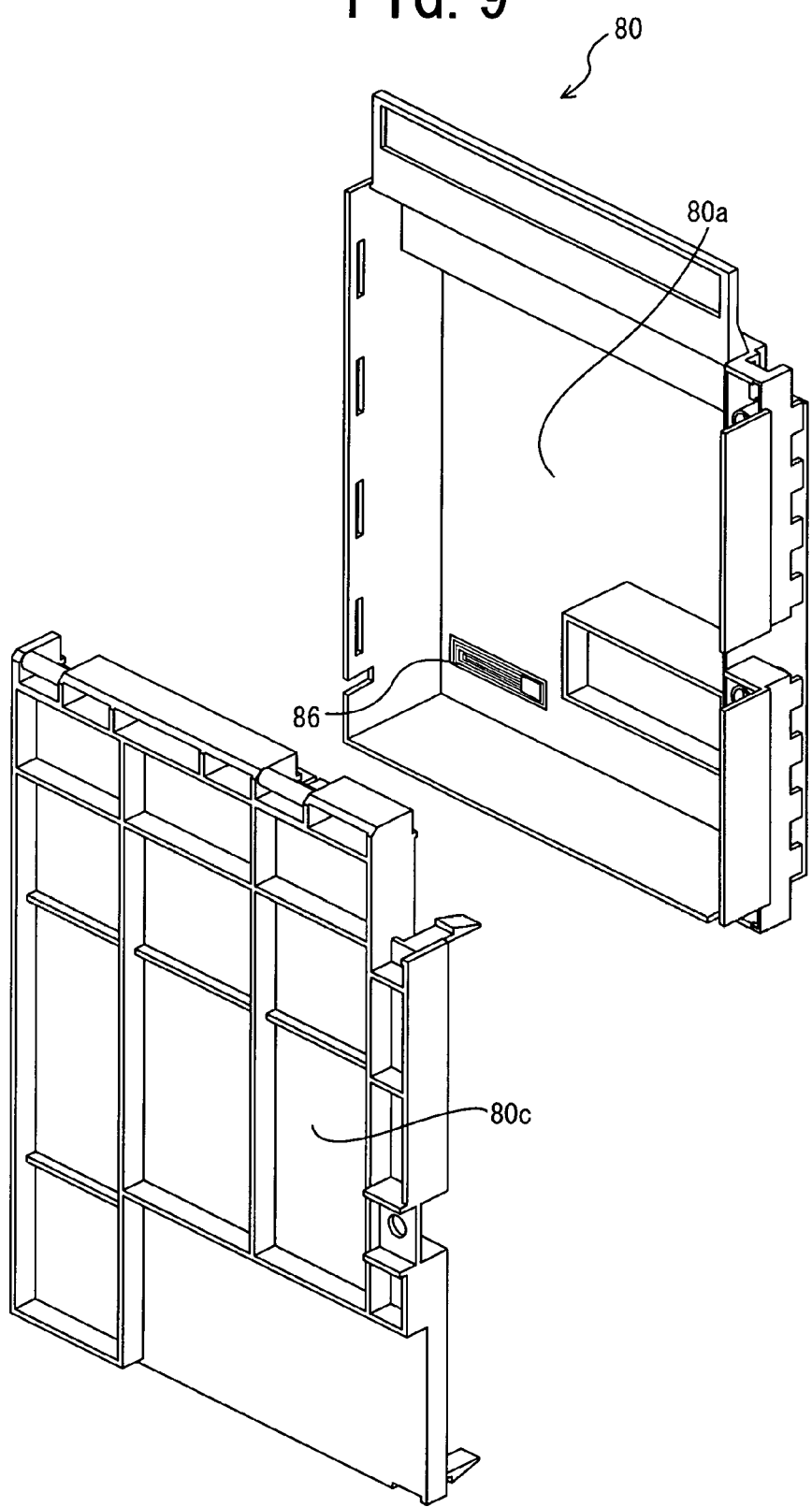
FIG. 9 is an exploded perspective view of the board box 80.

As shown in FIGS. 6 to 9, the board box 80 includes an upper lid portion 80a made of transparent resin in a substantially rectangular shape seen from its flat plane, and a lower lid portion 80c made of transparent resin also in a substantially rectangular shape seen from its flat plane. Further, the main control board 41 for performing main control to the pachinko game machine 1 is provided on the lower lid portion 80c opposing to the upper lid portion 80a. As shown in FIG. 9, an IC tag 86 in a small size and rectangular shape is attached on the backside of the upper lid portion 80a by an adhesive agent and the like.

Figure 10:
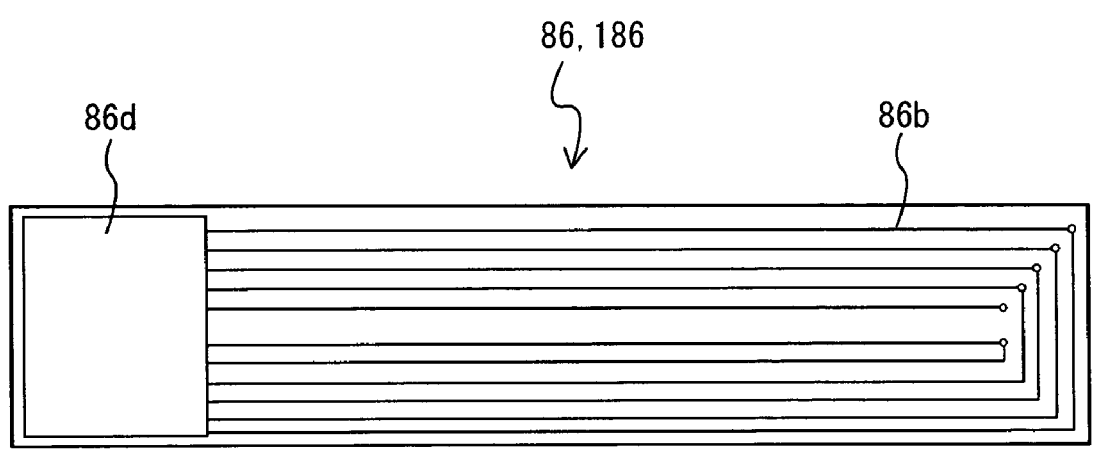
FIG. 10 is a front view of IC tags 86/186.

Here, a structure of the IC tag 86 will be described. FIG. 10 is a plan view of the IC tag 86. As shown in FIG. 10, the IC tag 86 includes an IC chip 86d in which an RF circuit 86a and an EEPROM 86c (see FIG. 16) are integrally formed on a thin flexible printed board, and an antenna circuit 86b.

Further, as shown in FIG. 8, a coil-shaped antenna 68 is provided at the lower right end of the main control board 41 for performing RF (radio frequency wireless) transmission and reception with the IC tag 86 by means of electromagnetic waves. The antenna 68 is connected with the R/W unit 56 by the coaxial cable 56k. In this embodiment, the IC tag 86 and the antenna 68 perform communication with each other at a short wave bandwidth of 13.56 MHz. The antenna 68 and the IC tag 86 are located so that their distance is about 3 mm in a state that the upper lid portion 80a and the lower lid portion 80c are assembled. At this distance, the RF transmission and reception is possible, and the IC tag 86 can respond to the calling from the R/W unit 56 via the antenna 21 68. On the other hand, the antenna 68 and the IC tag 86 are designed so that the communication therebetween is impossible if the distance exceeds about 5 mm. This communication available distance is adjustable by the number of turns of coils of the antenna 68 or a reactance value. Since the communication available distance is set in this manner, it is possible to detect even if the upper covering portion 80a is slightly opened. In addition, the communication available distance is arranged in such a manner that a slight swing due to vibration and the like does not cause unavailability of the communication.

The communication between the antenna 68 and the IC tag 86 is performed using electromagnetic waves. Therefore, in order to prevent erroneous actions due to the influence by noises from other members using electromagnetic waves, the IC tag 86 and the antenna 68 are located at the lower right end of the main control board 41. This location is apart from a prize ball ejecting device 49 and a launching motor 67 (described later) both using a solenoid.

Figure 11:
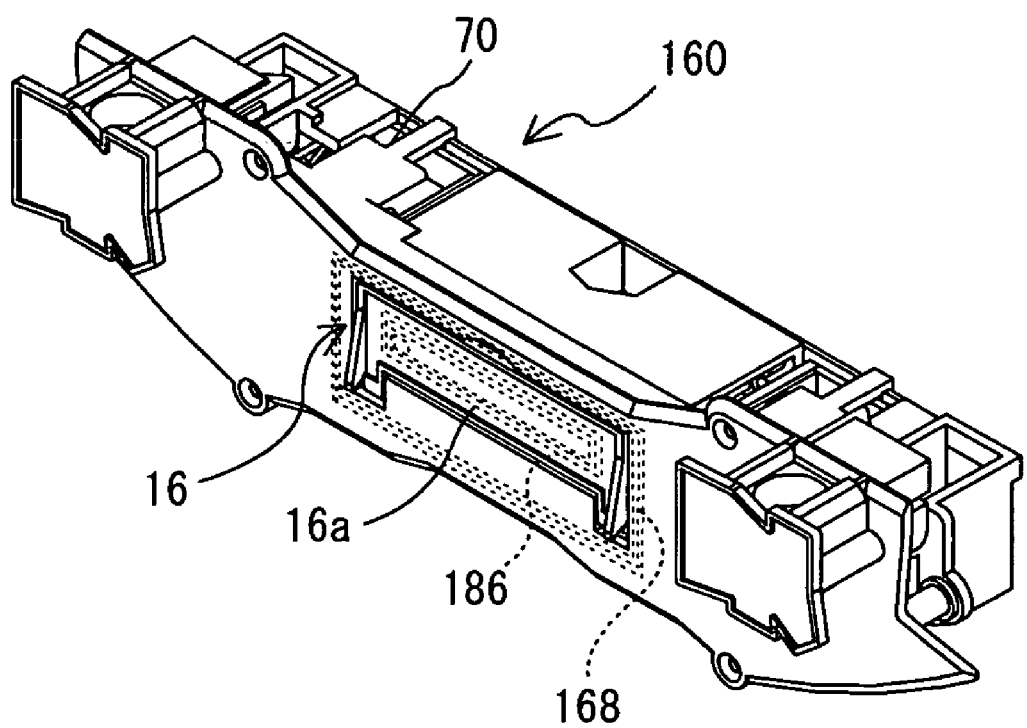
FIG. 11 is a perspective view of an attacker member 160 in a state that an opening-closing door 16a is closed.
Figure 12:
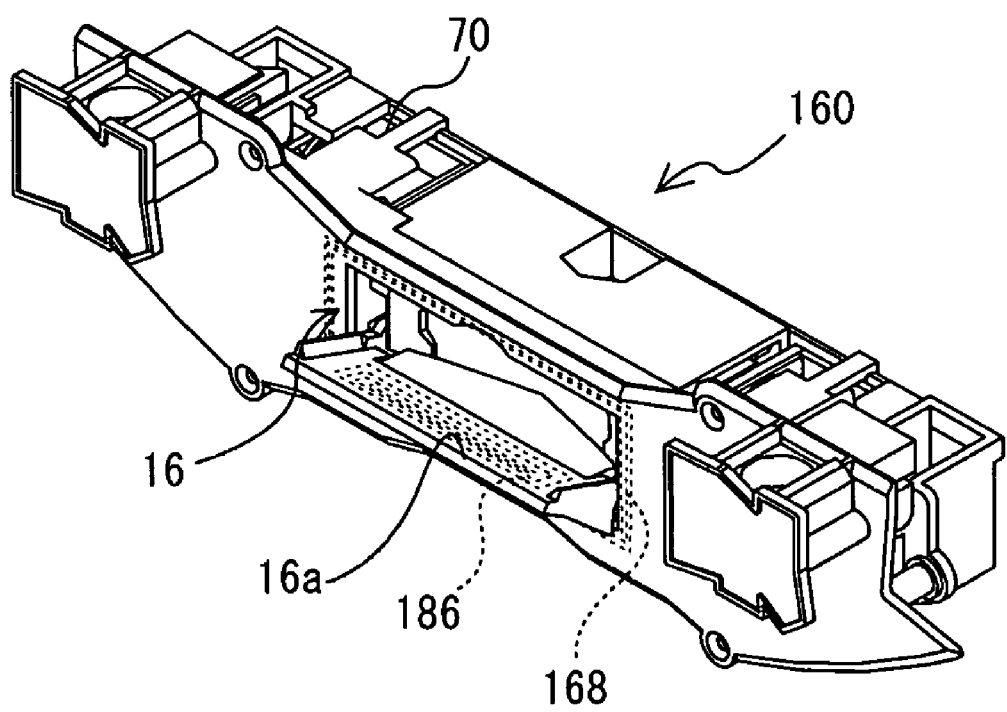
FIG. 12 is a perspective view of the attacker member 160 in a state that the opening-closing door 16a is opened.

Next, placement of an IC tag to an attacker member 160 provided with a big scoring hole 16, a kind of variable scoring device which opens and closes its door when a specified condition is established, will be described in detail based on FIGS. 11 and 12. FIG. 11 is a perspective view of the attacker member 160 with its opening-closing door 16a closed. FIG. 12 is a perspective view of the attacker member 160 with its opening-closing door 16a opened.

As shown in FIGS. 11 and 12, an IC tag 186 in the same shape as the IC tag 86 described above (see FIG. 10) is attached onto the surface of the opening-closing door 16a of the attacker member 160. Then, a decorative seal and the like is attached onto the IC tag 186 so as to cover the IC tag 186 so that the IC tag 186 is not visible by the game player. A loop-shaped antenna 168 is provided around the big scoring hole 16, which is an opening of the attacker member 160, so as to surround the IC tag 186. The antenna 168 is connected to the R/W unit 56 via the coaxial cable 56*k*. When the big scoring hole 16 is in its closed state shown in FIG. 11, the IC tag 186 and the antenna 168 are substantially flush with each other. The IC tag 186 has an directivity in a transmitting and receiving direction, and can perform transmission and reception only when it is located in parallel with the antenna. When the opening-closing door 16*a* is in its closed state as shown in FIG. 11, the antenna 168 and the IC tag 186 are in parallel with each other. Therefore, the IC tag 186 returns a reflected wave in response to a calling wave from the R/W unit 56 via the antenna 168. Contrarily, when the opening-closing door 16*a* is opened as shown in FIG. 12, the IC tag 186 and the antenna 168 are not in parallel with each other and form an angle therebetween which is beyond a communication available critical angle. As a result, the IC tag 186 cannot respond to the calling from the R/W unit 56.

As described above, the communication between the antenna 168 and the IC tag 186 is performed using electromagnetic waves. Therefore, in order to prevent erroneous actions due to the influence by noises from other members using electromagnetic waves, the IC tag 186 and the antenna 168 are located at positions apart from a big scoring hole opening solenoid 70 (described later) located to the back of the attacker member 160 at its left side.

Figure 13:
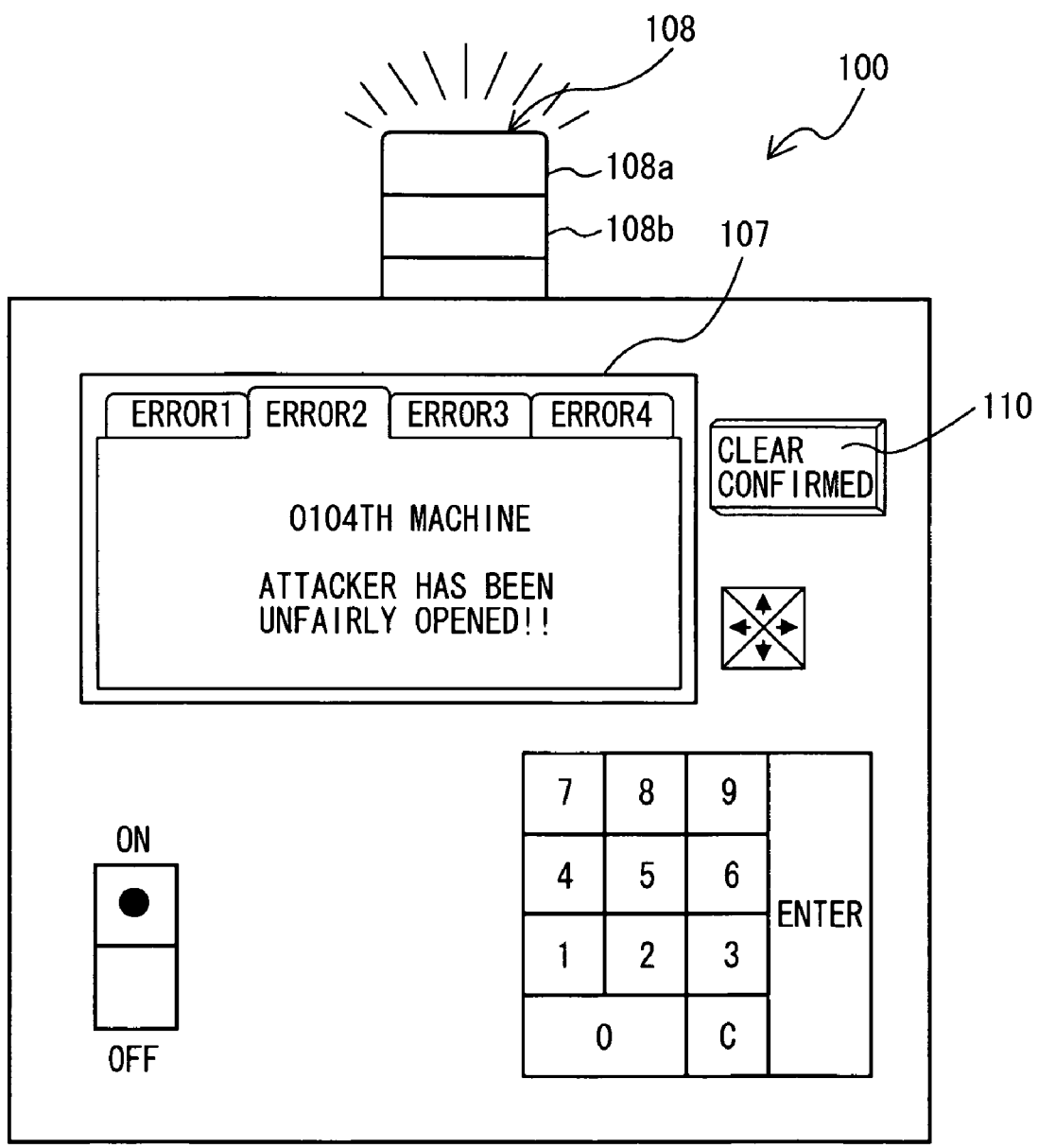
FIG. 13 is a front view of the management machine 100.

Next, a structure of the management machine 100 will be described with reference to FIG. 13. FIG. 13 is a front view of the management machine 100. A shown in FIG. 13, the management machine 100 includes an alarm lamp 108 at its upper portion and a display unit 107 at its front portion. The alarm lamp 108 includes, at its upper side, a red lamp 108*a* for annunciating that the opening-closing door 16*a* of the big scoring hole 16 has been opened, and also includes, at its lower side, a blue lamp 108*b* for annunciating that the board box 80 has been opened unfairly. When it is detected that the opening-closing door 16*a* of the big scoring hole 16 has been unfairly opened or the board box 80 has been opened at any one of the pachinko game machines 1 connected to the management machine 100, and this detection result is annunciated to the management machine 100, the lamps 108*a* and/or 108*b* illuminate to attract the attention of the staffs of the amusement center. The display unit 107 displays which member of which pachinko game machine 1 has been detected as having been opened. In FIG. 13, the display unit 107 displays that the attacker (the opening-closing door 16*a* of the big scoring hole 16) of the 104th pachinko game machine 1 has been unfairly opened, and the red lamp 108*a* illuminates. The alarm lamp 108 turns off after about 5 seconds. The display on the display unit 107 can be erased when a staff logs on as an administrator through inputting a secret identification number and the like and then presses a clear button 110.

4. Description of the Structure of the Hardware Inside the Device

Figure 14:
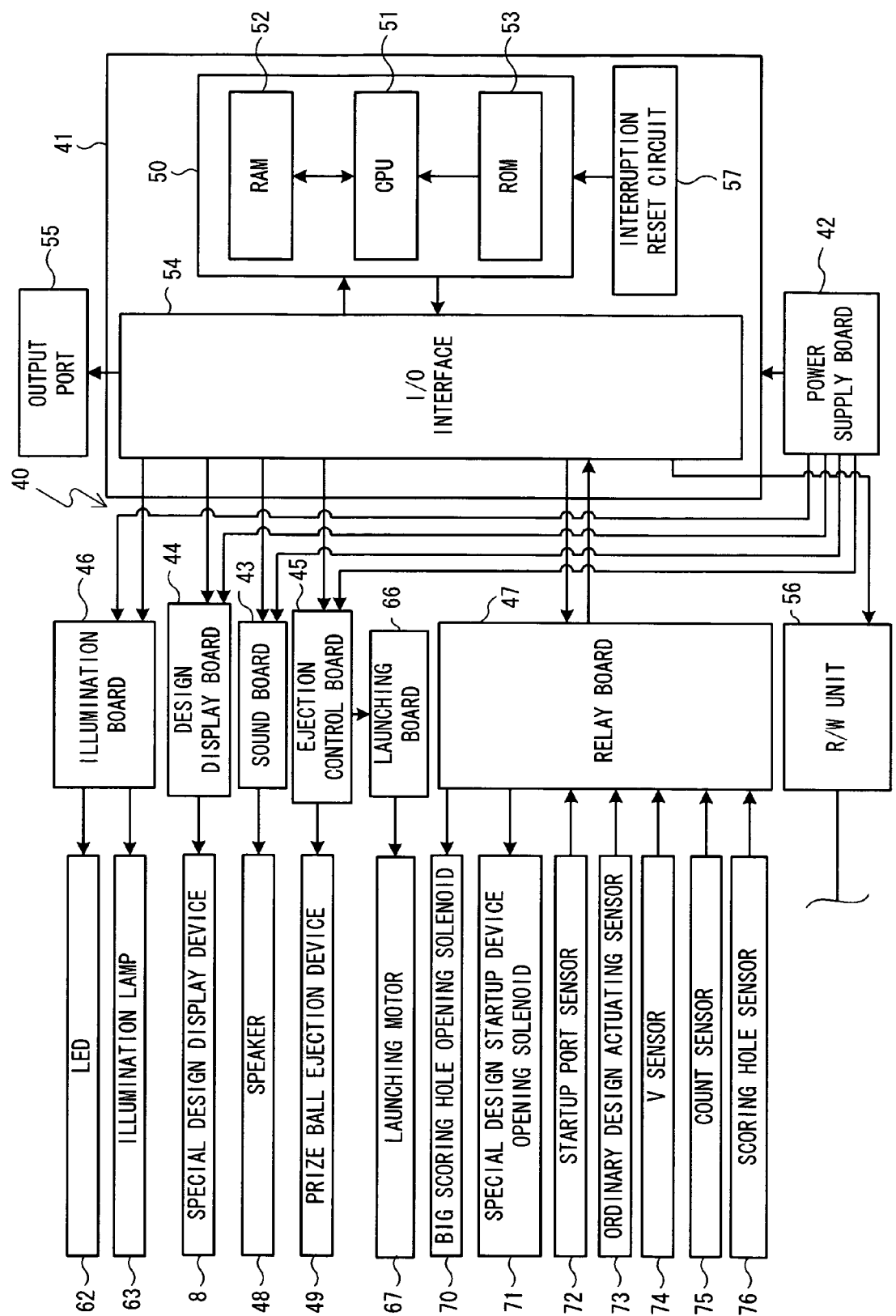
FIG. 14 is a block diagram showing an electric circuit structure of the pachinko game machine 1.

Next, an electric structure of the pachinko game machine 1 will be described with reference to FIG. 14. FIG. 14 is a block diagram showing an electric circuit structure of the pachinko game machine 1. The pachinko game machine 1 has its control section 40 at its backside. The control section 40 includes a main control board 41, a power supply board 42, a sound board 43, a design display board 44, an ejection control board 45, an illumination board 46, a relay board 47, and a launching board 66. The main board 41 includes an LSI 50 for performing various processings in accordance with a program (see FIG. 8). The LSI 50 includes a CPI 51 for performing various calculations, a RAM 52 for storing flags, counter values, data, programs and the like, and a ROM 53 for storing data of control programs and various kinds of initial values, and data of contents to be displayed on the special design display device 8. The CPU 51, the RAM 52, and the ROM 53 are integrally molded into one piece unit as a single LSI.

The main control board 41 also includes an I/O interface 54 for performing transmission and reception of data signals with the sound board 43, the design display board 44, the ejection control board 45, the illumination board 46, the relay board 47, and the like. The I/O interface 54 is connected with an output port 55 for outputting various kinds of game information of the pachinko game machine 1 to the central management computer 300. Alternatively, it may be structured such that various kinds of game information of the pachinko game machine 1 are outputted to the central management computer 300 via the R/W unit 56.

The sound board 43, the design display board 44, the ejection control board 45, the illumination board 46, and the launching board 66 are also respectively provided with a CPU (not shown), a RAM (not shown), a ROM (not shown), and an I/O interface (not shown). The main control board 41 performs a main control to the pachinko game machine 1. The power supply board 42 converts an alternate current (24V), which has been supplied thereto from the game machine placement island, into a direct current, and supplies this direct current to the respective boards. The sound board 43 controls generation of effect sounds of the pachinko game machine 1. The design display board 44 controls the special design display device 8. The ejection control board 45 controls the prize-ball ejection device 49. The illumination board 46 controls illumination states of various illuminations of the pachinko game machine 1. The relay board 47 relays wirings between various sensors. The launching board 66 controls the launching motor 67 for launching game balls.

The illumination board 46 is connected with an LED 62 and an illumination lamp 63. The design display board 44 is connected with the special design display device 8. The sound board 43 is connected with a speaker 48. The ejection control board 45 is connected with the prize-ball ejecting device 49. The relay board 47 is connected with a big scoring hole opening solenoid 70 for opening the opening-closing door 16*a* of the big scoring hole 16, a special design startup device opening solenoid 71, a startup port sensor 72 for detecting the game ball which has run into the special design startup device 15, a ordinary design actuating sensor 73 for detecting game balls which have passed through the ordinary design startup gates 11 or 12, a V sensor 74 for detecting the game ball which has entered the V zone in the big scoring hole 16, a count sensor 75 for counting the number of game balls which have entered the big scoring hole 16, and a scoring hole sensor 76 for detecting win balls which have entered into the ordinary scoring holes 19 or 20 and are collected to a win ball collecting section through an unillustrated guide passage.

The power supply board 42 is connected with the main control board 41, the sound board 43, the design display board 44, the ejection control board 45, and the illumination board 46 respectively, so that a stabilized electric power of direct current is supplied to these boards. The power supply board 42 is supplied with an alternate current of 24V. The power supply board 42 includes a rectifier made of an unillustrated silicon diode bridge, a smoothing circuit made of electrolysis capacitor, a stabilizing circuit made of a regulator IC, and the like. With this arrangement, the power supply board 42 can supply a stabilized direct current at 12V and 5V, and the like. Although not illustrated in FIG. 14, the main control board 41, the power supply board 42, the sound board 43, the design display board 44, the ejection control board 45, the illumination board 46, and the relay board 47 are all connected with each other through a ground line.

5. Description of the Structure of the Inventive Hardware

Figure 15:
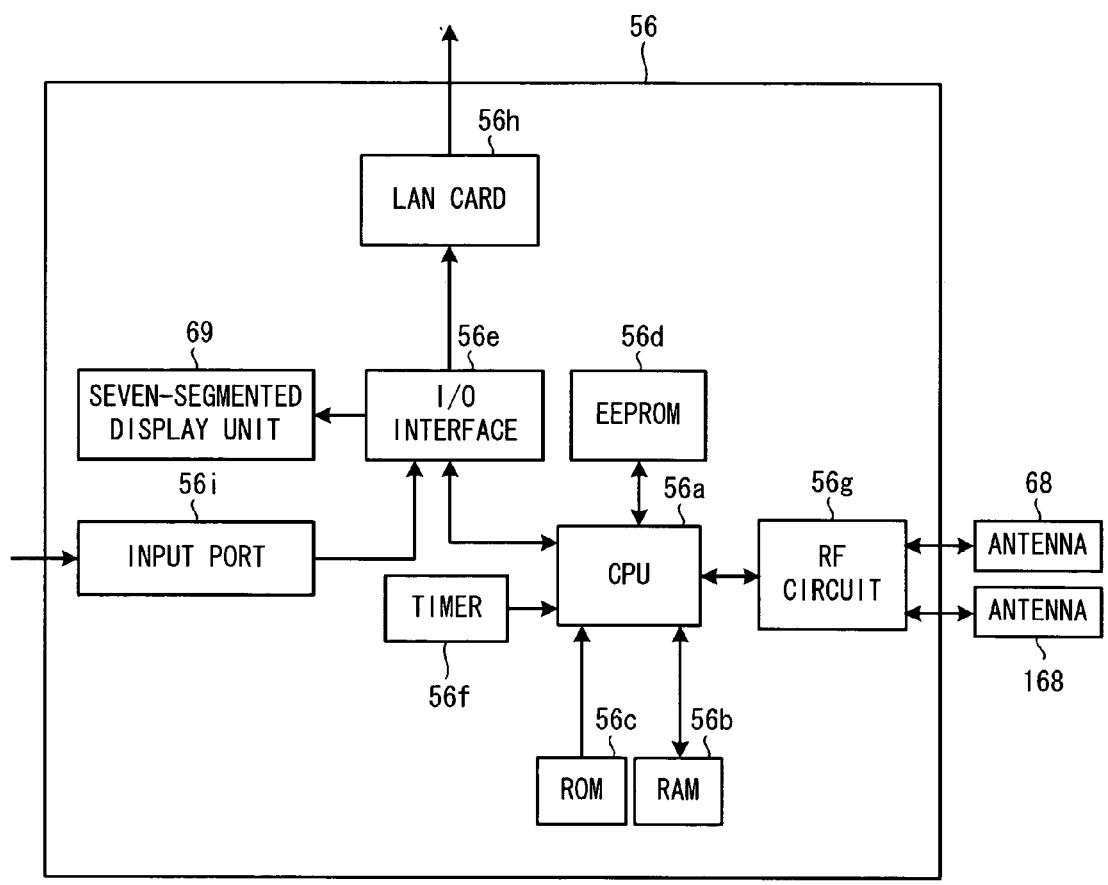
FIG. 15 is a block diagram showing an electric circuit structure of the R/W unit 56.

Next, an electric structure of the R/W unit 56 will be described with reference to FIG. 15. FIG. 15 is a block diagram showing an electric circuit diagram of the R/W unit 56. The R/W unit 56 includes a CPU 56a for performing various calculations, a RAM 56b for temporarily storing flags, data, and the like, a ROM 56c for storing control programs, data of various initial values, and the like, an EEPROM 56d for storing communication history with the IC tags 86 and/or 186, an I/O interface 56e, a timer 56f, an RF circuit 56g for releasing a calling wave to the IC tags 86 and/or 186 and receiving reflected waves from the IC tags 86 and/or 186, a LAN card 56h to be connected with a communication circuit 106 of the management machine 100, an input port 56i for receiving various signals from the main control board 41 of the pachinko game machine, and a seven-segmented display unit 69.

The CPU 56a transmits a calling wave from the RF circuit 56g to the IC tags 86 and/or 186 via the antennas 68 and/or 168. If there is a change in the presence or absence of the reflected waves from the IC tags 86 and/or 186, the EEPROM 56d stores the time. In the case where the reflected wave has returned, the CPU 56a immediately transmits a next calling wave. Contrarily, in the case where no reflected wave has returned, the EEPROM 56d stores the time and the CPU 56a again transmits a next calling wave. In this manner, the R/W unit 56 almost always makes communication with the IC tags 86 and/or 186 to check their states. The I/O interface 56e is connected with the communication circuit 106 of the management machine 100 via the LAN card 56h. The I/O interface 56e transmits to the communication circuit 106 an ID code and monitoring history data of the time of disappearance, the time of recovery, and the like. The R/W unit 56 receives various signals such as a big hit signal and the like from the main control board 41 of the pachinko game machine 1 via the input port 56i. The received big hit signal is used for checking that the opening-closing door 16a of the big scoring hole 16 has been normally opened during the processing for monitoring the opening action of the opening-closing door 16a.

Figure 16:
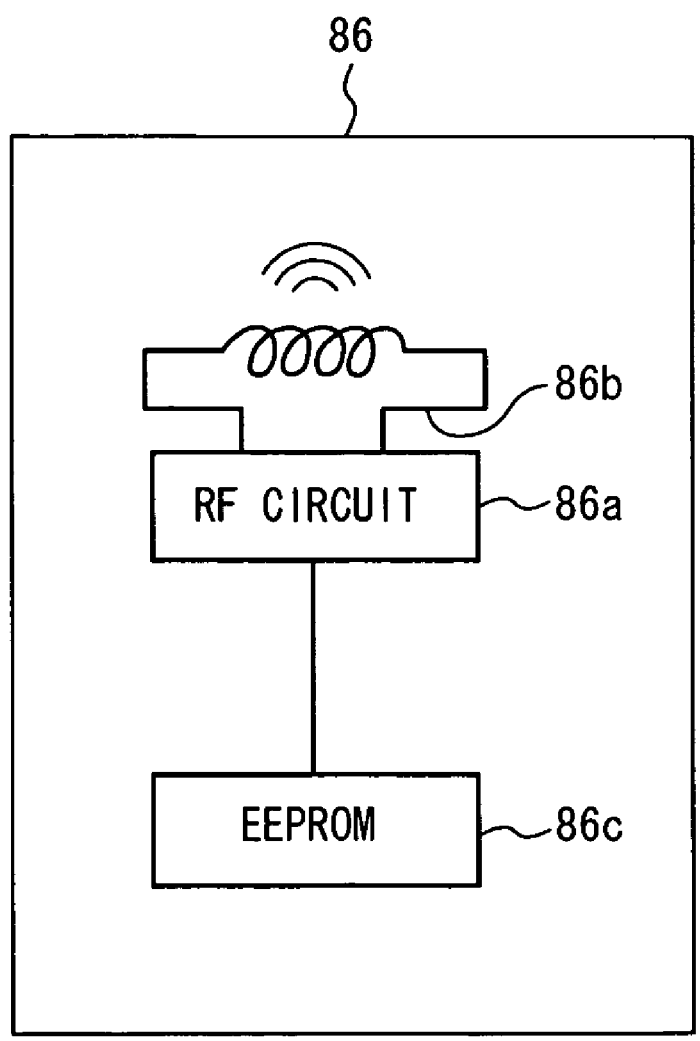
FIG. 16 is a block diagram showing an electric circuit structure of the IC tag 86.

Next, an electric structure of the IC tag 86 will be described with reference to FIG. 16. The IC tag 186 also has an identical electric structure. FIG. 16 is a block diagram showing an electric structure of the IC tag 86. The IC tag 86 includes an RF circuit 86a for releasing a reflected wave in response to the calling wave from the R/W unit 56, a coil antenna 86b, and an EEPROM 86c. The EEPROM 86c stores an ID code for distinguishing the IC tag 86 from other IC tags 86 and identification data of manufacturer ID, an amusement center ID, and the like in its over-writing and erase prohibited area. When a calling wave is sent from the R/W unit 56 via the antenna 68, the coil antenna 86b receives it. This calling wave contains a carrier wave component. Thus-received calling wave is rectified by the RF circuit 86a so as to produce a direct current voltage. Therefore, the IC tag 86 is capable of transmitting data whenever necessary without using battery or external power supply. When data is to be transmitted, the identification data of ID code and the like is read from the EEPROM 86c and is put onto the reflected wave. Then, thus-produced data is transmitted from the RF circuit 86a toward the antenna 68. It is also possible that data of the time of disappearance or the time of recovery, which has been temporarily store in the RAM 56b of the R/W unit 56 is received later and is stored in the EEPROM 86c.

Figure 17:
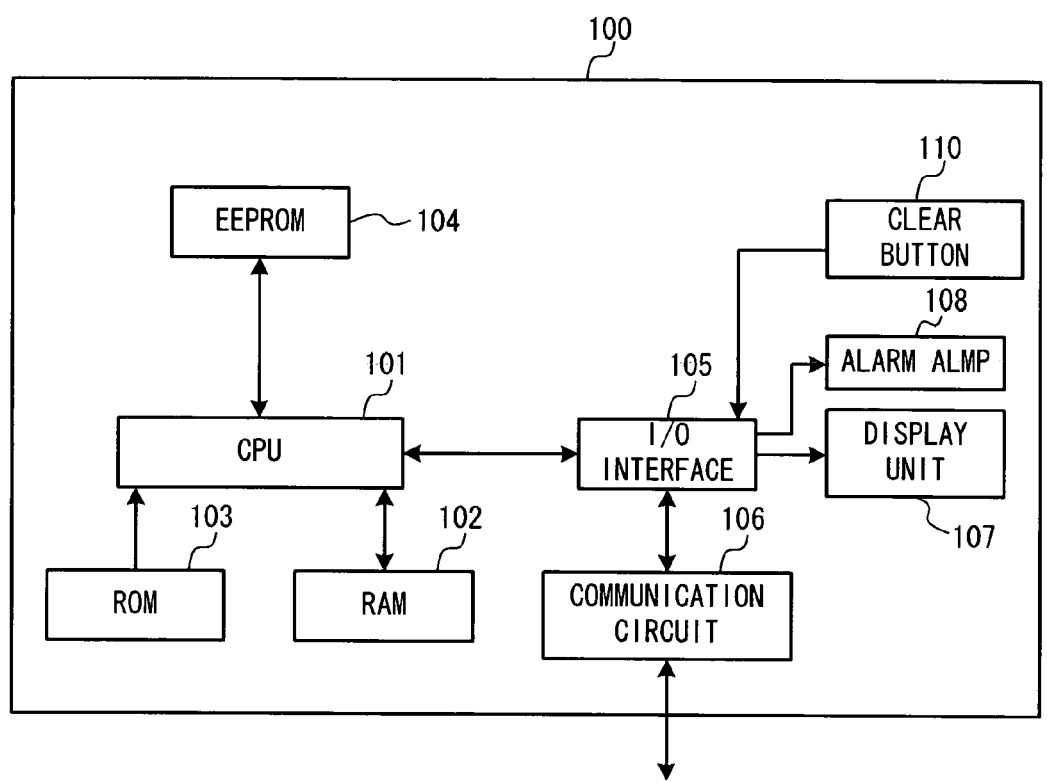
FIG. 17 is a block diagram showing the structure of the management machine 100.

Next, an electric structure of the management machine 100 will be described with reference to FIG. 17. FIG. 17 is a block diagram showing an electric structure of the management machine 100. As shown in FIG. 17, the management machine 100 includes a CPU 101 for performing various calculations, a RAM 102 for temporarily storing flags, data, and the like, a ROM 103 for storing control program, data of various initial values, and the like, an EEPROM 104 for storing an administrative right data base and a history data base, an I/O interface 105 for performing transmission and reception of data with the R/W unit 56, a communication circuit 106, a display unit 107 for displaying the received monitoring history data, an alarm lamp 108 which is illuminated based on the received monitoring history data, and a clear button 110 for erasing the displayed contents on the display unit 107.

The ROM 103 stores a management program. The CPU 101 calls out the management program and executes management. The communication circuit 106 receives an ID code and monitoring history data of the time of disappearance, the time of recovery and the like from the I/O interface 56e of the R/W unit 56 via the LAN card 56h and through the communication cable 150 such as a LAN cable. Based on the received monitoring history data, the display unit 107 makes a display and the alarm lamp 108 illuminates.

6. Description of the Operations of the Inventive Elements

Figure 18:
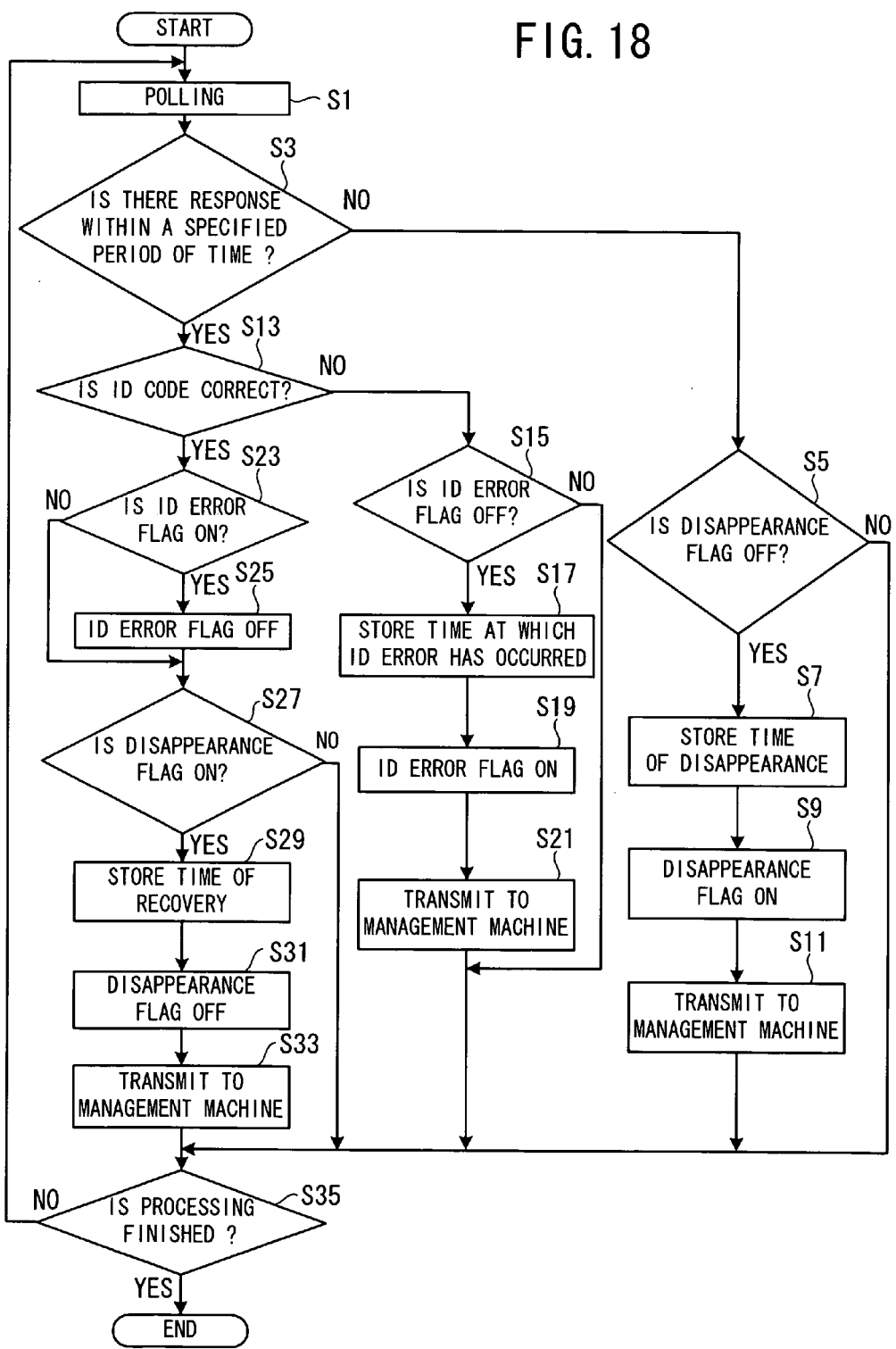
FIG. 18 is a flowchart of a monitoring processing for monitoring the state of the board box 80.

Next, a monitoring processing for monitoring the state of the board box 80 performed in the R/W unit 56 will be described with reference to the flowchart of FIG. 18. FIG. 18 is a flowchart of a monitoring processing for monitoring the state of the board box 80. The R/W unit 56 always monitors the board box 80, regardless of whether the amusement center is open or at night. In this embodiment, the R/W unit 56 receives electric power from the power supply of the game machine placement island, and the game machine placement island power supply remains powered even at night.

First, the CPU 56a in the R/W unit 56 transmits a calling wave to the IC tag 86 from the RF circuit 56g via the antenna 68 for polling (S1), and waits that the IC tag 86 returns the reflected wave with the ID code (identification data) carried thereon. Next, it is determined whether the reflected wave has been returned from the IC tag 86 within a specified period of time (S3). In this embodiment, the length of waiting time is set to 50 milliseconds.

If the reflected wave containing a true ID code is returned from the IC tag 86 within the specified period of time and this response is continuous from the previous time, the board box 80 can be determined as being in a normal state. In this determination, specifically, the following steps are executed. If a response has been returned within the specified period of time (S3: YES), it is determined whether or not the returned ID code is correct (S13). If the ID code is correct (S13: YES), it is determined whether the ID error flag is ON (S23). The ID error flag is used for checking whether or not a correct ID is returned continuously from the previous time. If the ID error flag is OFF (S23: NO), this means that a correct ID is returned continuously from the previous time. Next, it is determined whether or not a disappearance flag is ON (S27). The disappearance flag is used for checking whether or not a response has been made from the IC tag 86 within the period of time specified at a previous time. If the disappearance flag is OFF (S27: NO), this means that an ID code has been returned from the IC tag 86 within the specified period of time also at a previous time. Therefore, a correct ID code is returned within the specified period of time continuously from the previous time. As a result, the board box 80 is determined as being in a normal state, and nothing is stored and no data is transmitted to the management machine 100. Then, the process directly proceeds to S35.

If no response is returned within the specified period of time (S3: NO), the IC tag 86 may be distanced to be out of the range in which the communication with the antenna 68 is available, unless the machine is out of order. In this case, there is a possibility that the upper covering portion 80a of the board box 80 to which the IC tag 86 is attached has been opened. At this point of time, the board box 80 is determined as being in an abnormal state. Next, it is determined whether or not this abnormal state is continued. If the abnormal state is continued, the time is already stored and the data showing abnormal state is already transmitted to the management machine 100 as will be described later. Therefore, it is needed to neither store nor transmit data on top of the data of the case where there is no change in the state. This arrangement saves storage capacity. Specifically, it is determined whether or not the disappearance flag stored in the EEPROM 56d is OFF (S5). The disappearance flag is set to ON as far as no response is returned from the IC tag, and is set to OFF as far as a response is returned from the IC tag. If the disappearance flag is ON instead of OFF (S5: NO), this is a case where no response has been returned continuously from the previous calling. Therefore, no subsequent processing is performed any more and the process proceeds to S35.

If the disappearance flag is OFF (S5: YES), this means that this is the first time that no response is returned. In this case, it is determined that any change has occurred in the state and the time at which polling has been made on the IC tag is stored in the EEPROM 56d as the time of disappearance (S7). Then, the disappearance flag is turned ON (S9). Next, an ID code is combined with the time of disappearance and is transmitted from the I/O interface 56e and the LAN card 56h to the management machine 100 via the communication cable 150 such as a LAN cable (S1). Then, the process proceeds to S35. In this manner as described above, a history is stored at the point of time when an abnormality has occurred and data is transmitted to the management machine 100, and the management machine 100 makes an annunciation.

If a response has been returned within the specified period of time (S3: YES) but the returned ID code is incorrect (S13: NO), there is a possibility that a deceit action of replacement of the IC tag 86 has been made. At this point of time, the board box 80 is determined as being in an abnormal state. Then, it is determined, as is performed in the case where no response is obtained, whether or not this abnormal state is continuous. Specifically, it is determined whether or not the ID error flag is OFF (S15). The ID error flag is set to ON as far as the ID code is not correct. If the ID error flag is ON instead of OFF (S15: NO), this is the case where the ID code is not correct continuously from the previous time. No subsequent processing is performed any more and the process proceeds to S35.

If the ID error flag is OFF (S15: YES), this means that this is the first time that the ID code is not correct. In this case, the polling time is stored in the EEPROM 56d as the time when the ID error has occurred (S17). Then, the ID error flag is turned ON (S19). Subsequently, the ID code is combined with the ID error occurrence time and is transmitted from the I/O interface 56e and the LAN card 56h to the management machine 100 via the communication cable 150 such as a LAN cable (S21). Then, the process proceeds to S35.

If the ID code is correct (S13: YES), it is determined whether or not the ID error flag is ON (S23). If the ID error flag is ON (S23: YES), this means that the ID code has returned to a correct ID code this time, and the ID error flag is turned OFF (S25). Then, it is determined whether or not the disappearance flag is ON (S27).

If the disappearance flag is ON (S27: YES), this means that the IC tag which has not responded previous time has responded this time. In this case, it is determined that there is a change in the state and the time at which the response has been returned this time is stored in the EEPROM 56d as the time of recovery (S29). The EEPROM 56d completes to store the time of disappearance when the response stops. By also storing the time of recovery at this time, it becomes possible to calculate the period of time during when the board box 80 has been opened. Then, the disappearance flag is turned OFF (S31). Subsequently, the ID code is combined with the time of recovery, and is transmitted to the management machine 100 via the communication cable 150 such as a LAN cable (S33). Then, it is determined whether or not the processing is finished (S35). If finished (S35: YES), the processing is end. If still not finished (S35: NO), the process returns to S1 and the processing is continued.

The processing is performed as described above, and if a true ID code is returned within the specified period of time continuously from the calling of the previous time, the board box 80 is determined as being in a normal state and the process returns to a step in which the polling to the ID code is performed (S1). If no response is returned within the specified period of time, or if there is a response within the specified period of time but the response has a wrong ID code, the board box 80 is determined as being in an abnormal state. In any case, it is checked whether or not the state is continued from the previous time, and the time is stored only when this is the first time that the state has changed. Even if a true ID code is returned within the specified period of time but no response has been returned at the previous time, it is determined that there is a change in the state even if the state is normal and the time is stored. Then, data is transmitted to the management machine 100 on top of the storage of the time. When the storage or data transmission is performed, the process returns to S1 immediately after a series of processings is finished and calls out the ID code again. In the manner as described above, the IC tag 86 is always called out to check its state, and a necessary processing is performed based on the result of determination. With this arrangement, it is possible to check the abnormality in the board box 80 and store the history of the change in the state by means of a minimum storage capacity, thereby performing monitoring efficiently.

Figure 19:
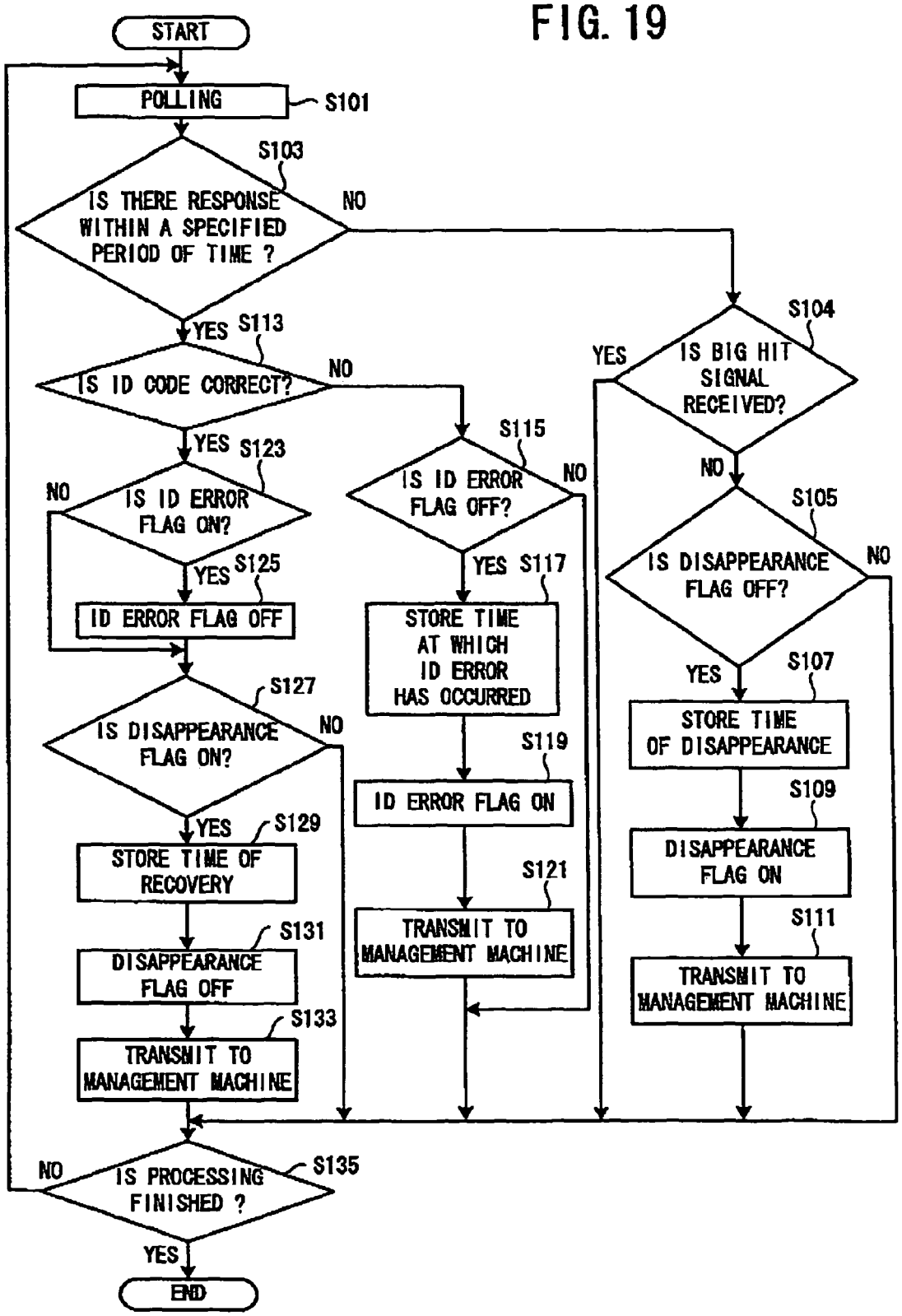
FIG. 19 is a flowchart of a monitoring processing for monitoring the state of the attacker member 160.

Next, a monitoring processing for monitoring the state of the attacker member 160 performed in the R/W unit 56 will be described with reference to the flowchart of FIG. 19. FIG. 19 is a flowchart of the monitoring processing for monitoring the state of the attacker member 160. The sequence of the processing is almost the same as the monitoring processing performed for the board box 80 except for the following. That is, different from the board box 80, since the opening-closing door 16a of the big scoring hole 16 of the attacker member 160 is normally opened at the time of big hit, it is necessary to receive a big hit signal from the main control board 41 so as to check whether or not this is a normal opening action. After the amusement center is closed and the electric power of the pachinko game machines 1 is turned off, it is next to impossible to unfairly open the opening-closing door 16a of the big scoring hole 16 in the guise of big hit. Therefore, the monitoring processing is not performed for the attacker member 160.

First, the CPU 56a in the R/W unit 56 transmits a calling wave from the RF circuit 56g to the IC tag 186 via the antenna 168 for palling (S101), and waits that the IC tag 186 returns an ID code (identification data). Next, it is determined whether or not a reflected wave has been returned from the IC tag 186 within a specified period of time (S103) In this embodiment, the wait time is set to 50 milliseconds.

If a true ID code is returned from the IC tag 186 within the specified period of time and the response is continued from the previous time, it can be determined that the opening-closing door 16a of the big scoring hole 16 is not opened. In this determination, specifically, the following processings are preformed. If a response has been returned within the specified period of time (S103: YES), it is determined whether or not the returned ID code is correct (S113). If the ID code is correct (S113: YES), it is determined whether or not an ID error flag is ON (S123). The ID error flag is used for determining whether or not a correct ID has been returned continuously from the previous time. If the ID error flag is OFF (S123: NO), this means that a correct ID has been returned continuously from the previous time. Next, it is determined whether or not the disappearance flag is ON (S127). The disappearance flag is used for checking whether or not a response has been returned from the IC tag 186 within the period of time set at the previous time. If the disappearance flag is OFF (S127: NO), this means that the ID code has been returned from the IC tag 186 also at the previous time within the specified period of time. Since a correct ID code has been returned within the specified period of time continuously from the previous time, it is determined that the opening-closing door 16a of the big scoring hole 16 is not opened. In this case neither storage nor data transmission to the management machine 100 is performed, and the process directly proceeds to S135.

If a response is not returned within the specified period of time (S103: NO), it is imagined that the opening-closing door 16a to which the IC tag 186 is attached has been opened, except that the machine is out of order. Then, it is determined whether or not a big hit signal has been received from the output port 55 of the main control board 41 to the input port 56i (S104). If a big hit signal has been received (S104: YES), this means that the opening-closing door 16a of the big scoring hole 16 has normally been opened due to a big hit, and the process directly proceeds to S135. If no big hit signal has been received (S104: NO), the big scoring hole 16 is in an abnormal state at this point of time. Then, it is determined whether or not this abnormal state is continued. If the abnormal state is continued, the time is already stored and the abnormal data is already transmitted to the management machine as will be described later. Therefore, it is needed to neither store nor transmit data on top of the data of the case where there is no change in the state. This arrangement saves storage capacity. Specifically, it is determined whether or not the disappearance flag stored in the EEPROM 56d is OFF (S105). The disappearance flag is set to ON as far as no response is returned from the IC tag, and is set to OFF as far as a response is returned from the IC tag. If the disappearance flag is ON instead of OFF (S105: NO), this is a case where no response has been returned continuously from the previous calling. Therefore, no subsequent processing is performed anymore and the process proceeds to S135.

If the disappearance flag is OFF (S105: YES), this means that this is the first time that no response is returned. In this case, it is determined that any change has occurred in the state and the time at which polling has been made on the IC tag is stored in the EEPROM 56d as the time of disappearance (S107). Then, the disappearance flag is turned ON (S109). Next, an ID code is combined with the time of disappearance and is transmitted to the management machine 100 via the communication cable 150 such as a LAN cable (S111). Then, the process proceeds to S135. In this manner as described above, a history is stored at the point of time when an abnormality has occurred and data is transmitted to the management machine 100, and the management machine 100 makes an annunciation.

If a response has been returned within the specified period of time (S103: YES) but the returned ID code is incorrect (S113: NO), there is a possibility that a deceit action of replacement of the IC tag 186 has been made. At this point of time, the big scoring hole 16 is determined as being in an abnormal state. Then, it is determined, as is performed in the case where no response is obtained, whether or not this abnormal state is continuous. Specifically, it is determined whether or not the ID error flag is OFF (S115). The ID error flag is set to ON as far as the ID code is not correct. If the ID error flag is ON instead of OFF (S115: NO), this is the case where the ID code is not correct continuously from the previous time. No subsequent processing is performed any more and the process proceeds to S135.

If the ID error flag is OFF (S115: YES), this means that this is the first time that the ID code is not correct. In this case, the polling time is stored in the EEPROM 56d as the time when the ID error has occurred (S117). Then, the ID error flag is turned ON (S119). Subsequently, the ID code is combined with the ID error occurrence time and is transmitted from the I/O interface 56e to the management machine 100 via the communication cable 150 such as a LAN cable (S121). Then, the process proceeds to S135.

If the ID code is correct (S113: YES), it is determined that the ID error flag is ON (S123). If the ID error flag is ON (S123: YES), this means that the ID code has returned to a correct ID code this time, and the ID error flag is turned OFF (S125). Then, it is determined that the disappearance flag is ON (S127).

If the disappearance flag is ON (S127: YES), this means that the IC tag which has not responded previous time has responded this time. In this case, it is determined that there is a change in the state and the time at which the response has been returned this time is stored in the EEPROM 56d as the time of recovery (S129). The EEPROM 56d completes to store the time of disappearance when the response stops. By also storing the time of recovery at this time, it becomes possible to calculate the period of time during when the opening-closing door 16a of the big scoring hole 16 has been opened. Then, the disappearance flag is turned OFF (S131). Subsequently, the ID code is combined with the time of recovery, and is transmitted to the management machine 100 via the communication cable 150 such as a LAN cable (S133). Then, it is determined whether or not the processing is finished (S135). If finished (S135: YES), the processing is end. If still not finished (S135: NO), the process returns to S101 and the processing is continued.

The processing is performed as described above, and if a true ID code is returned within the specified period of time continuously from the calling of the previous time, the attacker member 160 is determined as being in a normal state and the process returns to a step in which the polling to the ID code is performed (S101). If no response is returned within the specified period of time and no big hit is made, or if there is a response within the specified period of time but the response has a wrong ID code, the opening-closing door 16a of the big scoring hole 16 is determined as being in an abnormal state. In any case, it is checked whether or not the state is continued from the previous time, and the time is stored only when this is the first time that the state has changed. Even if a true ID code is returned within the specified period of time but no response has been returned although no big hit was made at the previous time, it is determined that there is a change in the state even if the state is normal and the time is stored.

Then, data is transmitted to the management machine 100 on top of the storage of the time. When the storage or data transmission is performed, the process returns to S101 immediately after a series of processings is finished and calls out the ID code. In the manner as described above, the IC tag is always called out to check its state, and a necessary processing is performed based on the result of determination. With this arrangement, it is possible to check the abnormality in the attacker member 160 and store the history of the change in the state by means of a minimum storage capacity, thereby performing monitoring efficiently.

Figure 20:
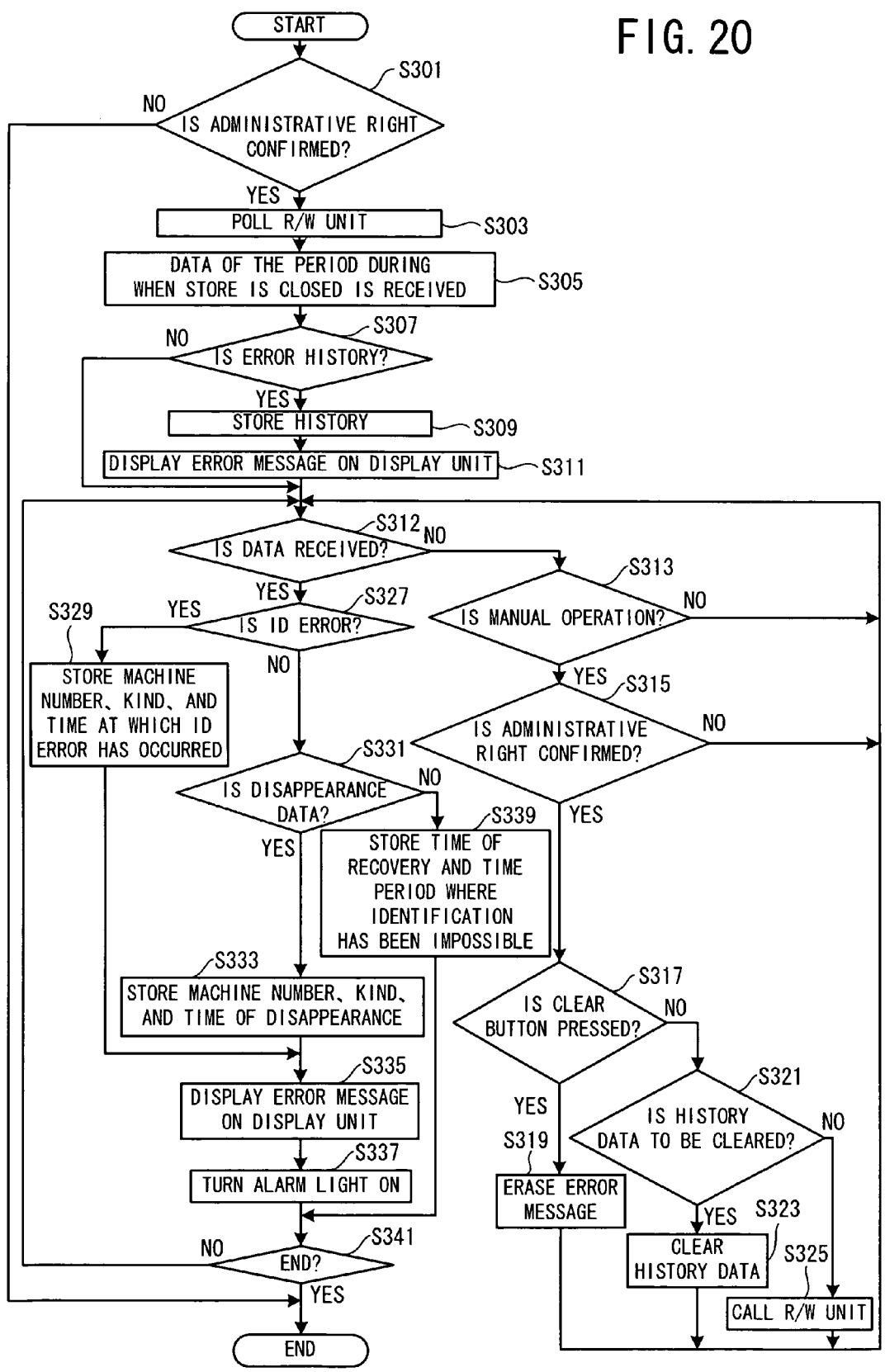
FIG. 20 is a flowchart showing an outline of the processing in the management machine 100.

Next, a processing performed in the management machine 100 will be described based on the flowchart of FIG. 20 and the history data base of FIG. 21. FIG. 20 is a flowchart schematically showing the processing performed in the management machine 100. FIG. 21 is a schematic diagram showing a history data base to be stored in the EEPROM 104 of the management machine 100.

When the amusement center is opened and the electric power of the management machine 100 is turned on, the processings in S301 to S311 of the opening of the amusement center are performed. First, an input by a staff is accepted and it is determined whether or not the administrative right has been confirmed through such as a password, an ID card, and the like (S301). The administrative right is checked by the administrative right data base stored in the EEPROM 104 of the management machine 100 and comparing the input password or the ID of the staff with the password or the ID stored in the data base. If administrative right is not confirmed(S301: NO), the processing is finished. If administrative right is confirmed(S301: YES), polling is performed for the R/W unit 56 belonging to each pachinko game machine 1 via the communication cable 150 (S303). Then, a monitoring history during the time when the amusement center is closed is received (S305). If an error history is received (S307: YES), the history is stored in the history data base of the EEPROM 104 (S309), and the details of the error is displayed on the display unit 107 (S311).

After the processing of the opening of the amusement center is finished, the monitoring processing in S312 to S341 during when the amusement center is open is repeated. First, it is determined whether or not data has been received from the R/W unit 56 belonging to the pachinko game machine 1 (S312). If data has been received (S312: YES), it is determined whether or not the data is ID error data (S327). If the data is ID error data (S327: YES), the machine number of the pachinko game machine 1 and the location (kind) of the IC tag where the ID error has occurred are determined from the ID code. The information and the time when the ID error has occurred are stored in the history data base of the EEPROM 104 (S329). As shown in FIG. 21, the history data base stores about a week of ID codes, the machine numbers of the pachinko game machines 1, the locations (kinds) of the IC tags which have fallen in a state that they cannot be identified, the times of disappearance, the times of recovery, the periods of time during which the identification is impossible from the time of disappearance to the time of recovery, and the times when the ID error has occurred. Then, an error message is displayed on the display unit 107, such as "ID error has occurred in the board box of XXth pachinko game machine" (S335), and the corresponding alarm lamp is illuminated (S337). When the alarm lamp is illuminated and the error message is displayed on the display unit 107, a staff of the amusement center on patrol and the like becomes aware of the states of the board box 80 or the big scoring hole 16, and goes to the pachinko game machine 1 in question to check its state.

If the received data is not ID error data (S327: NO), it is determined whether or not the received data is disappearance data which is a combination of the ID code with the time of disappearance (S331). If the received data is disappearance data (S331: YES), the machine number of the pachinko game machine 1 and the location (kind) where the disappeared IC tag has been placed are determined from the ID code, and the information and the time of disappearance are stored in the history data base of the EEPROM 104 (S333). Then, an error message displayed on the display unit 107, such as "the attacker of XXth pachinko game machine has been unfairly opened" as shown in FIG. 13 (S335), and the corresponding alarm lamp is illuminated (S337).

If the received data is not disappearance data (S331: NO), it is recovery data obtained from the IC tag which has been temporarily in a communication unavailable state and then returned to a communication available state. The sent ID code is searched on the history data base, and the time of recovery is stored in the corresponding record. Further, the period of time where the identification has been impossible from the time of disappearance to the time of recovery is calculated and stored (S339). Then, the process proceeds to S341.

If no data has been received from the R/W unit 56 (S312: NO), it is determined whether or not a manual operation by a staff of the amusement center and the like has been made (S313). If no manual operation has been made (S313: NO), the process returns to S312. If a manual operation has been made (S313: YES), it is determined whether or not the administrative right has been confirmed (S315). If no administrative right is confirmed (S315: NO), the process returns to S312. If administrative right is confirmed (S315: YES), it is determined whether or not the clear button 110 for erasing the display on the display unit has been pressed (S317). If the display is to be erased (S317: YES), the error message displayed on the display unit 107 is erased (S319). As shown in FIG. 13, the display unit 107 of the management machine 100 displays the machine number of the pachinko game machine 1 and the location of the IC tag which has been lost (the board box 80 and/or the attacker member 160). At the same time, the alarm lamp 108b is illuminated in the case of the board box 80 and the alarm lamp 108a is illuminated in the case of the attacker member 160. When a staff and the like of the amusement center is notified of such an annunciation and responds to the abnormality in the amusement center, the display thereafter is not needed any more, and the display is erased by a manual operation. When the processing of erasing the display is finished, the process returns to S312 where the reception of data is waited.

If the display is not to be erased (S317: NO), it is determined whether or not clearing the history data is requested (S321). The history data stored in the IC tag or R/W unit 56 is cleared when a clear command is received after a predetermined period of time has elapsed, so that new history data can be stored. After the history data is transmitted to the central management computer 300, it is not needed to store the history in the IC tag, the R/W unit 56, or the management machine 100 any more. By periodically clearing history data, the IC tag and the R/W unit can be structured with a small storage capacity. If clearing of the history data is requested (S321: YES), the history data stored in the IC tag, the R/W unit 56, and/or the EEPROM 104 of the management machine 100 is erased (S323). Then, the process returns to S312 where the reception of data is waited. If clearing of history data is not requested(S321: NO), polling is performed to the R/W unit 56 (S325) and the reception of data is waited (S312). The R/W unit 56 is called out by manipulating the keyboard of the management machine 100. In the manner as described above, a staff of the amusement center and the like can check the states of the board box 80 and the big scoring hole 16 to be monitored whenever necessary.

When the processing in S337 or S339 is finished, it is determined whether or not the entire processing should be finished (S341). If the entire processing should be finished (S341: YES), the entire processing is finished. If the entire processing should not be finished (S341: NO), the process returns to S312 and the reception of data is waited.

7. Description of the Exemplified Modifications

The present invention is not limited to the embodiment described above, and various modifications may be made. Hereinafter, exemplified modifications of this embodiment to which the present invention is applied are described. First, in the embodiment of the present invention, the R/W unit 56 is connected with the management machine 100 using the wired communication cable 150. Alternatively, the same structure is also available by employing wireless connection using an infrared communication or wireless communication and the like. In addition, in the embodiment described above, a single management machine 100 is provided to each island where the game machines are placed. Alternatively, a single management machine 100 may be provided to a plurality of islands together, or the central management computer 300 which manages the overall amusement center may be structured in such a manner that it serves also as the management machine. The same effect as of the embodiment described above may be realized by employing a structure in which various kinds of game information of the pachinko game machine 1 are directly transmitted to the central management computer 300 without passing through the R/W unit 56 or the management machine 100, and the R/W unit 56 receives only a big hit signal.

The location of the R/W unit 56 is not limited to the outside of the center covering 90. The R/W unit 56 may be mounted to other locations in the pachinko game machine 1 or may be mounted to the game machine placement island. Further, it is possible to employ a structure in which, instead of preparing one R/W unit 56 for each of the pachinko game machine 1, one or a plurality of R/W units 56 are provided to an island for monitoring IC tags provided to a plurality of pachinko game machines 1. Further, it is possible to employ a structure in which the R/W unit 56 is supplied with electric power from the pachinko game machine 1 side, for example, from the main control board 41 or the power supply board 42 having a backup power supply, instead of being supplied with electric power from the game machine placement island. In the case of employing a structure in which the R/W unit 56 is supplied with power supply from the main control board 41 of the pachinko game machine 1, after the amusement center is closed, the monitoring processing can be continued using electric power supplied from the backup power supply of the pachinko game machine 1. In addition, it is also possible to employ a structure in which the R/W unit 56 includes a backup power supply therein. This backup power supply is charged during when the amusement center is open, and after the amusement center is closed, the R/W unit 56 operates using the backup power supply.

In the embodiment described above, the IC tag is provided to the attacker member as a movable member. The placement of the IC tag is not limited to the attacker member, but the IC tag may also be provided to a variable scoring device such as an ordinary electric device and the like. In this case, as is the case where the IC tag is provided to the attacker member, it is possible to monitor the variable scoring device to check that it has been opened unfairly.

Figure 22:
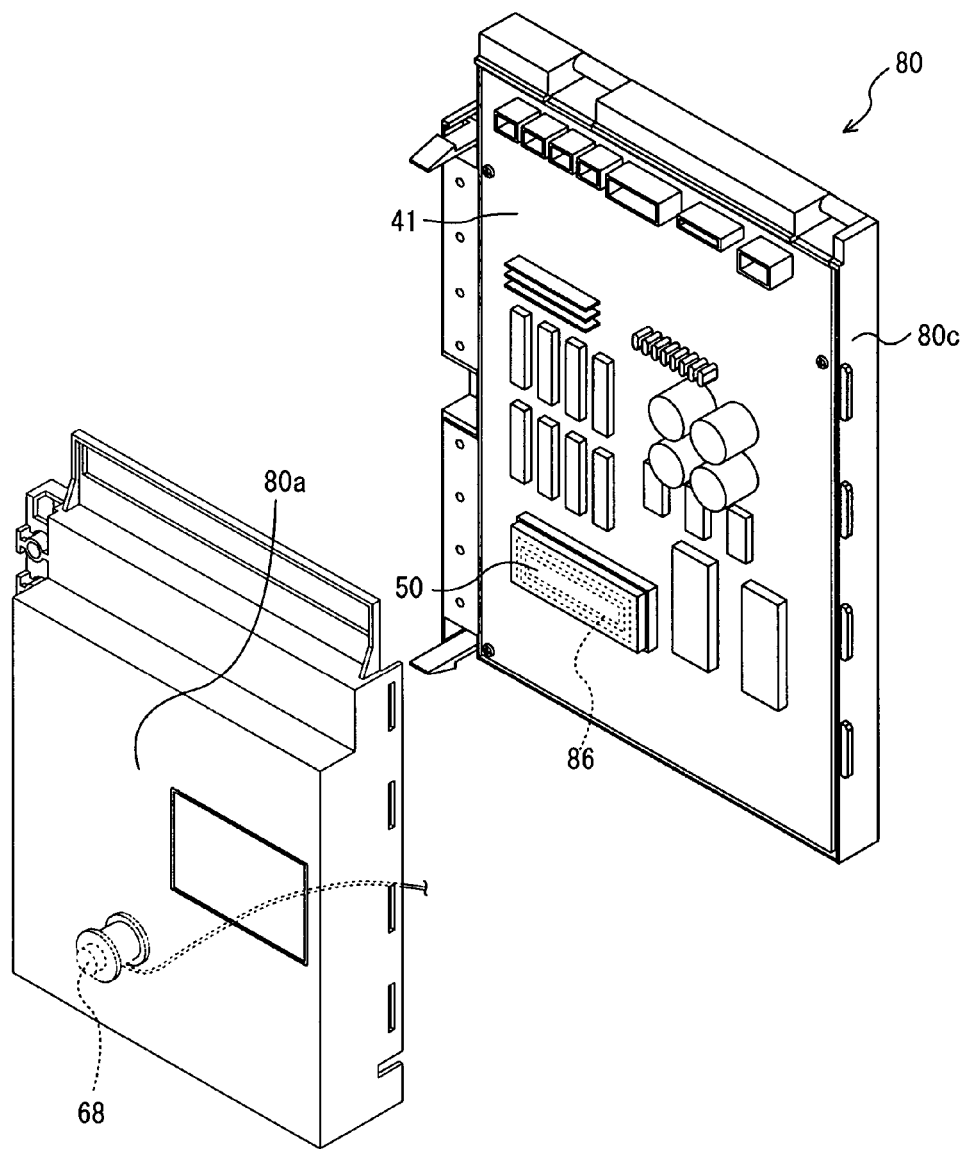
FIG. 22 is an exploded perspective view of a board box 80 in a modification.
Figure 23:
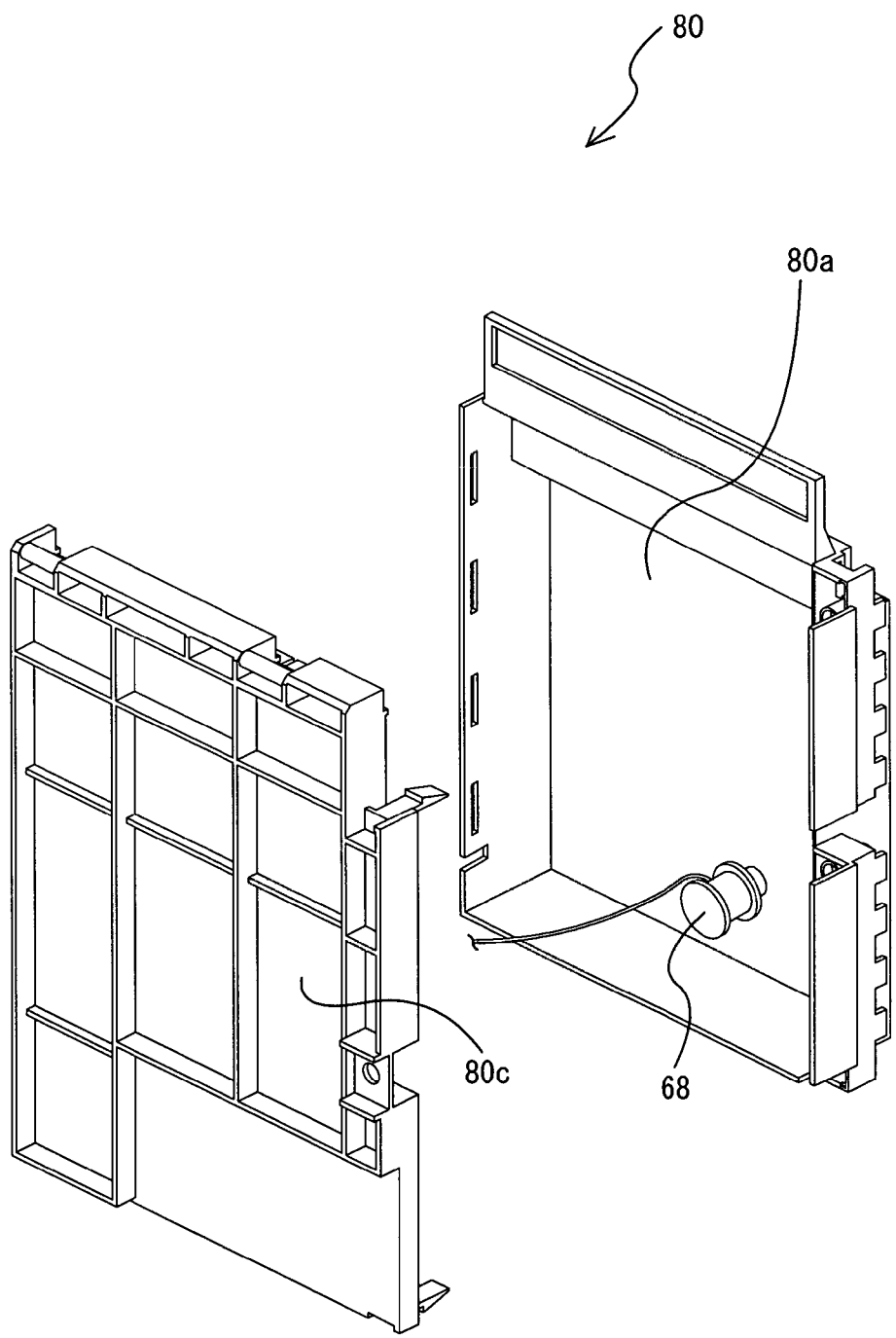
FIG. 23 is an exploded perspective view of a board box 80 in a modification.

The IC tag 86 is not limited to a thin and small rectangle shape as in the embodiment described above. Alternatively, the IC tag 86 may be freely structured in its shape and size, and may be in a coin shape, a stick shape and the like. Further, the IC tag 86 is not limited to an electromagnetic induction system as in the embodiment described above. Alternatively, the IC tag 86 may be in any other various systems such as electromagnetic coupling system, microwave system, light system, and the like. In addition, the IC tag 86 may be buried in the molded portion of the LSI 50, instead of being fixedly attached to the backside of the upper lid portion 80*a*. FIGS. 22 and 23 are exploded perspective views of the board box 80 showing the case where the IC tag 86 is buried in the LSI 50 on the main control board 41. In this exemplified modification, the IC tag 68 is provided within the LSI 50 on the main control board 41, and the antenna 68 is located on the upper lid portion 80*a*. Since the monitoring system detects that the upper lid portion 80*a* has been opened through the communication between the antenna 68 and the IC tag 86, the same effect as of the foregoing embodiment can be achieved in this modification. In addition, unauthorized replacement of the ROM also can be found on top of the opening and closing action. The IC tag may be integrally molded in the upper lid portion, or alternatively, may be structured so that the IC tag is destroyed when being peeled off after it is attached.

Figure 24:
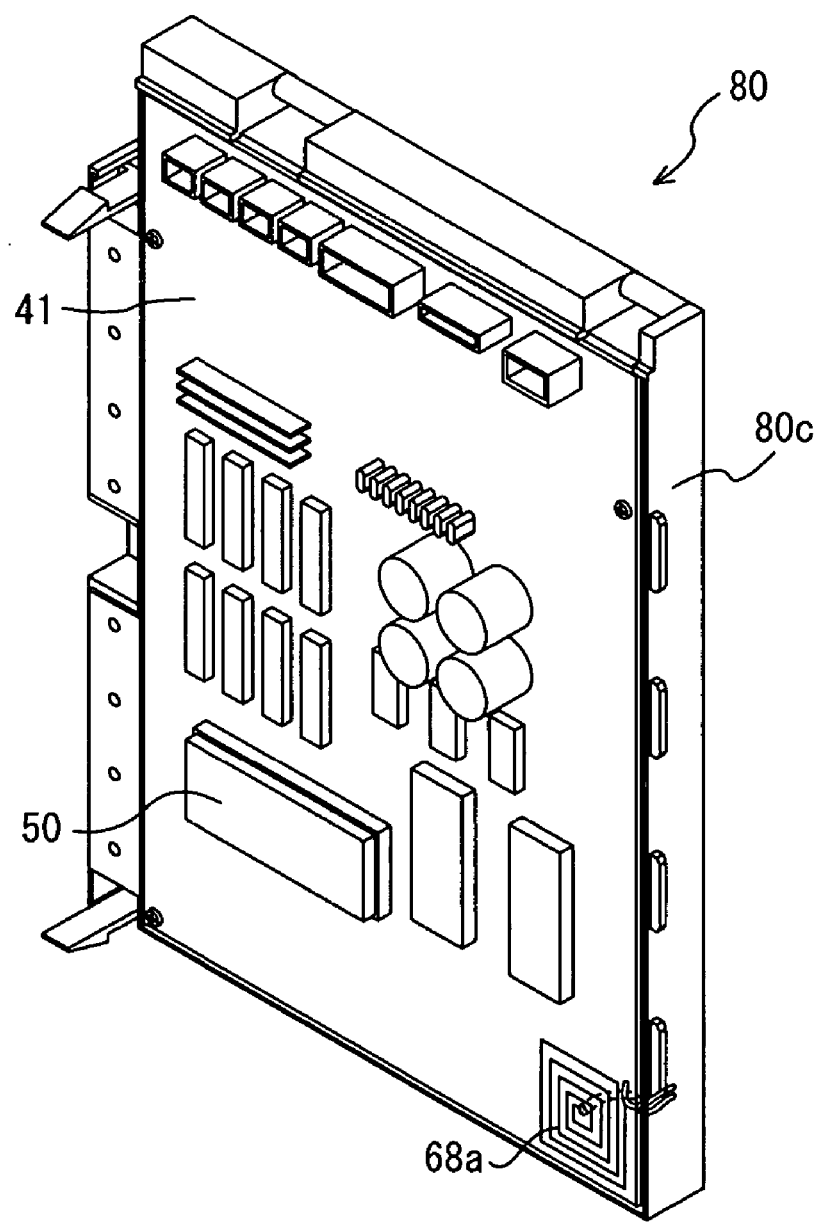
FIG. 24 is a perspective view of a board box 80 in another modification.

Further, as shown in the perspective view of FIG. 24, the antenna 68 may be formed by being printed on the main control board 41 at the same time when the circuit pattern is formed. If the antenna 68 is printed on the main control board 41, the number of its parts can be reduced. The position and shape of the antenna 68 to be printed is not limited to the lower right position and spiral shape respectively as shown in FIG. 24. Alternatively, the antenna 68 may be printed by being winded several times into a spiral shape along the outer periphery of the board. In this case, the IC tag 86 can establish the communication with the antenna 68 whichever position the IC tag 86 is located on the main control board 41. Further, the antenna 168 for making communication with the IC tag 186 to be attached on the opening and closing door 16*a* of the big scoring hole 16 may be attached on the glass frame 13 or the glass plate. The communication available distance between the IC tag and the antenna is not limited to about 5 mm as in the foregoing embodiment, but is adjustable according to the necessity by changing the location of the IC tag where the IC tag performs monitoring.

In the monitoring processing in the foregoing embodiment, the length of waiting time that the reflected wave is returned from the IC tag is set to 50 milliseconds. However, the length of waiting time is not limited to 50 milliseconds, but is variable within the range of several milliseconds and several seconds as far as the monitoring can be performed in real time. Instead of storing the time of disappearance and the time of recovery in the EEPROM 56*d* of the R/W unit 56, a hard disc may be provided within the R/W unit 56 and the time of disappearance and the time of recovery are stored therein, or other storage medium such as an optical medium may be employed for storing these times. Alternatively, these times may be temporarily stored in the RAM 56*b*, and data may be transmitted to the management machine, and then the RAM 56*b* may be cleared. When this structure is employed, the EEPROM 56*b* is not necessary. In addition, a structure may be employed in which, if no response is returned, the polling time is temporarily stored in the RAM 56*b* of the R/W unit 56 as the time of disappearance. Then, the polling time is stored in the EEPROM 86*c* of the IC tag 86 together with the time of recovery in the case of recovery. When this structure is employed, the history is held in both the EEPROM 86*c* and the management machine. Therefore, in case that the data in the management machine has disappeared, the history remains. If the IC tag is returned to the manufacturer of the pachinko game machine 1, the history is also managed by the manufacturer. Further, a power supply may be provided within the IC tag 86, so that the history is stored in the EEPROM 86c at the same time that it is stored in the EEPROM 56d. Alternatively, the history may be stored in the EEPROM 86c instead of the EEPROM 56d. Still alternatively, the results are only transmitted to the management machine 100 without being stored in the RAM and EEPROM 86c during when the amusement center is open, but are stored only during when the amusement center is closed. In addition, although the details of received data are stored to allow the display unit to only display and the alarm lamp to illuminate in the processing performed in the management machine 100, a structure may be employed in which the stored details are transmitted to the central management computer 300 and are stored therein for about one month, or are transmitted to the external storage device instead. In addition, the length of time that the identification is impossible may be calculated in the R/W unit 56 instead of the management machine 100, and may be transmitted from the R/W unit 56 to the management machine 100 together with the recovery data.

8. Effects of the Embodiment

As described above, according to the management system of this embodiment, the IC tags are provided to the board box 80 of the pachinko game machine 1 connected to the management machine 100 and the opening and closing door 16a of the big scoring hole 16 respectively. A calling wave is almost always transmitted from the R/W unit 56 to the respective IC tags and the IC tags are allowed to return reflected waves including the identification data of the IC tags. If any IC tag returns no response (responses have disappeared) or starts to respond again (responses have recovered), the ID code, the time of disappearance and the time of recovery of the IC tag are transmitted to the management machine 100. When receiving such data transmission, the management machine 100 stores the details of the received data and allows the display unit 107 to display the details, so as to alert a staff and the like to the abnormality. In this manner, the management system serves to find deceit actions at an early stage or to prevent deceit actions.

INDUSTRIAL APPLICABILITY

As described above, the monitoring system of the present invention is suitable for monitoring the operating status of devices such as game machines which may possibly be subjected to deceit actions.

The invention claimed is:

1. A gaming system monitoring system comprising:
an IC tag, and
an IC tag monitoring device that communicates with the IC tag, wherein said IC tag stores identification data that is used for distinguishing the IC tag from other IC tags, and said IC tag monitoring device includes:
a transmission circuit that transmits a calling wave for calling said IC tag,
a reception circuit that receives a reflected wave returned from said IC tag,
an antenna that is connected to said transmission circuit and said reception circuit,
determination means for determining that an abnormality has occurred if said reception circuit does not receive the reflected wave within a specified period of time since said transmission circuit transmits the calling wave and the IC tag monitoring device is unable to communicate with the IC tag, or if said identification data contained in said reflected wave differs from registered data that is registered beforehand, and
storage means for storing a result of a determination made by said determination means, and for storing monitoring history data containing at least one of a time of disappearance that is the point of time at which a communication available state in which said reception circuit can receive said reflected wave has changed into a communication unavailable state in which said reception circuit cannot receive said reflected wave, a time of recovery that is the point of time at which said communication unavailable state has changed into said communication available state, and a time of ID abnormality that is the point of time at which identification data different from the registered data that has been registered beforehand was received,
wherein said storage means does not store said determination result and said monitoring history data when the result of the determination made by said determination means is normal continuously from a most recent determination result, and said storage means does store said determination result and said monitoring history data when the result of the determination made by said determination means is abnormal continuously from the most recent determination result.

2. The gaming system monitoring system according to claim 1, wherein said reception circuit cannot receive said reflected wave if a distance between said IC tag and said antenna changes to a value exceeding a specified threshold value.

3. The gaming system monitoring system according to claim 1, wherein said transmission circuit transmits the calling wave to said IC tag, and transmits the calling wave to said IC tag again immediately after said determination means has made determination and said storage means has made storage.

4. The gaming system monitoring system according to claim 1, wherein said IC tag monitoring device comprises output means for outputting to the outside said determination result and said monitoring history data that said storage means has stored.

5. A gaming system monitoring system comprising:
an IC tag, and
an IC tag monitoring device that communicates with the IC tag, wherein said IC tag stores identification data that is used for distinguishing the IC tag from other IC tags, and said IC tag monitoring device includes:
a transmission circuit that transmits a calling wave for calling said IC tag,
a reception circuit that receives a reflected wave returned from said IC tag,
an antenna that is connected to said transmission circuit and said reception circuit,
determination means for determining that an abnormality has occurred if said reception circuit does not receive the reflected wave within a specified period of time since said transmission circuit transmits the calling wave and the IC tag monitoring device is unable to communicate with the IC tag, or if said identification data contained in said reflected wave differs from registered data that is registered beforehand, and
output means for outputting to the outside a result of a determination made by said determination means, and monitoring history data containing at least one of a time of disappearance that is the point of time at which a communication available state in which said reception circuit can receive said reflected wave has changed into a communication unavailable state in which said reception circuit cannot receive said reflected wave, a time of recovery that is the point of time at which said communication unavailable state has changed into said communication available state, and a time of ID abnormality that is the point of time at which identification data different from the registered data that has been registered beforehand was received, wherein said storage means does not store said determination result and said monitoring history data when the result of the determination made by said determination means is normal continuously from a most recent determination result, and said storage means does store said determination result and said monitoring history data when the result of the determination made by said determination means is abnormal continuously from the most recent determination result.

6. The gaming system monitoring system according to claim 4, wherein said transmission circuit transmits the calling wave to said IC tag, and transmits the calling wave to said IC tag again immediately after said determination means has made determination and said output means has made output.

* * * * *